US012503056B2

(12) United States Patent
Queener et al.

(10) Patent No.: US 12,503,056 B2
(45) Date of Patent: Dec. 23, 2025

(54) LOCKING CARGO RESTRAINT WITH MULTIPLE RETRACTING CABLES

(71) Applicant: Mobren, Inc., League City, TX (US)

(72) Inventors: Monty Queener, League City, TX (US); Brian Kirk, Kingwood, TX (US); Erik Nolte, New York, NY (US)

(73) Assignee: Mobren, Inc.

( * ) Notice: Subject to any disclaimer, the term of this patent is extended or adjusted under 35 U.S.C. 154(b) by 566 days.

(21) Appl. No.: 17/759,333

(22) PCT Filed: Jan. 22, 2021

(86) PCT No.: PCT/US2021/014637
§ 371 (c)(1),
(2) Date: Jul. 22, 2022

(87) PCT Pub. No.: WO2021/150907
PCT Pub. Date: Jul. 29, 2021

(65) Prior Publication Data
US 2023/0073654 A1    Mar. 9, 2023

Related U.S. Application Data

(60) Provisional application No. 62/965,260, filed on Jan. 24, 2020.

(51) Int. Cl.
| | |
|---|---|
| *B60R 9/048* | (2006.01) |
| *B60P 7/06* | (2006.01) |
| *B65H 75/42* | (2006.01) |

(52) U.S. Cl.
CPC ............... *B60R 9/048* (2013.01); *B60P 7/06* (2013.01); *B65H 75/425* (2013.01)

(58) Field of Classification Search
CPC .......... B60R 9/048; B60P 7/08; B60P 7/0838; B60P 7/06; B61D 45/001; A44B 11/2542;
(Continued)

(56) References Cited

U.S. PATENT DOCUMENTS

| | | | |
|---|---|---|---|
| 7,249,727 B2 * | 7/2007 | Kovacevich | ....... A41D 13/0518 |
| | | | 242/388.2 |
| 7,789,603 B2 | 9/2010 | Huck | |
| | (Continued) | | |

FOREIGN PATENT DOCUMENTS

| | | |
|---|---|---|
| CN | 206126509 U | 4/2017 |
| JP | 10-330047 A | 12/1998 |
| | (Continued) | |

OTHER PUBLICATIONS

Machine translation of Tomoto, JP 2001-1287741 A, published Oct. 16, 2001. (Year: 2001).*

(Continued)

*Primary Examiner* — Daniel J Colilla
(74) *Attorney, Agent, or Firm* — HUSCH BLACKWELL LLP

(57) ABSTRACT

A locking cargo restraint with multiple retracting cables is provided for securing cargo to a base, surface, or object. The locking cargo restraint is generally composed of a housing, retractable cables, and spools. The cables may be spooled within the housing to take up slack for storage of the device or to provide tension when cargo is being secured. The spools are spring biased to assist the user in pulling the cables into the housing. The cables are independently operable, allowing the operator to secure symmetrical or irregularly shaped objects. The locking cargo restraint also features a mode selection knob that can effectuate different modes of operation of the device such that the cables may be extended from the housing, retracted into the housing, or tightened about cargo. Further, the device includes a lock mechanism that, when engaged, limits the operation of the mode selection knob.

18 Claims, 22 Drawing Sheets

(58) Field of Classification Search
CPC ... A44B 11/125; A44B 11/2557; B65H 59/04; B65H 75/425; B65H 75/40; A43C 11/165; F16G 11/12; E05B 73/0029
See application file for complete search history.

(56) References Cited

U.S. PATENT DOCUMENTS

| | | |
|---|---|---|
| 8,973,222 B2 | 3/2015 | Breeden et al. |
| 2021/0245991 A1* | 8/2021 | Johnson ............. B65H 75/4492 |

FOREIGN PATENT DOCUMENTS

| | | |
|---|---|---|
| JP | 2001-287741 A | 10/2001 |
| KR | 10-1509659 B1 | 4/2015 |

OTHER PUBLICATIONS

International Search Report for International Application No. PCT/US2021/014637, May 7, 2021, 2 pages.
Second Chinese Office Action with Supplementary Search Report for Chinese Application No. 202180010677.1, Aug. 5, 2024, 12 pages with Statement of Relevance.

* cited by examiner

LOCKING CARGO RESTRAINT WITH MULTIPLE RETRACTING CABLES

CROSS REFERENCE TO RELATED APPLICATIONS

This application is a U.S. National Phase Application of International Application No. PCT/US2021/014637 filed on Jan. 22, 2021, which claims the benefit of priority from U.S. Patent Application No. 62/965,260, filed on Jan. 24, 2020.

FIELD OF INVENTION

The present invention relates generally to restraints, and more particularly to a locking cargo restraint with multiple retracting cables that may be used to secure items during transport or storage.

BACKGROUND OF INVENTION

People who engage in outdoor recreation often transport large items that are stowed in a truck bed, on a trailer, or in a cargo hold attached to the hitch of a vehicle. Such large items include food and drink coolers. These items, if left unrestrained, can slide around the truck bed or off the cargo hold, resulting in damage to the items or their contents. To prevent unwanted movement of the items relative to the transport mechanism, users often restrain the items with devices such as ropes, ratchet straps, and bungee cords. These restraint devices often feature a flexible member that can wrap around objects, as well as connecting means to link the flexible member to the cargo or a surface. The restraint device can be used to directly connect the cargo to another object by connecting one end of the restraint device to the cargo, wrapping the flexible member around the cargo and the object, and fastening the device's opposite end to the object. The restraint device may also be used by connecting both of its ends to a first item and wrapping its flexible member around a second item. However, these traditional straps are unwieldy and difficult to use, since they easily tangle during the restraining process. Further, these straps are difficult to efficiently store, requiring the user to manually wrap them to prevent tangling. Finally, the straps may only effectively secure one item at a time, or several items that easily nest together.

In addition, the outdoor recreation market has trended toward more expensive products. For instance, manufacturers have developed premium tailgate-mounted coolers with extra features, high functionality, and luxury branding. These and other expensive products are frequently stowed on the exterior of vehicles, becoming targets for theft.

To deter theft of cargo items, consumers have turned to security devices, such as keyed or coded theft deterrents (examples include cable locks, bike locks, and padlocks). Unfortunately, these devices are not able to sufficiently restrain cargo against unwanted motion. Further, they work best when the cargo and the storage location provide appropriate features for the locks to act on.

Even flexible security devices, which usually use a cut-resistant flexible member such as wire rope or chain, do not guard against unwanted cargo motion. First, the loops of the flexible members are typically of a fixed length that cannot be shortened or elongated to secure cargo tightly to another item. Second, variable length security devices do not provide a mechanism for tensioning the flexible member to better restrain or secure the cargo. In effect, flexible security devices only tether the cargo without restraining the cargo against shifting.

Thus, the market has failed to develop a convenient and effective method for simultaneously restraining cargo items against unwanted motion and deterring the theft of cargo items. Without locks, traditional restraining methods are easily removed. Traditional locking ratchet straps are vulnerable to tampering or cutting of the straps. Further, as stated previously, security devices are ineffective at restraining cargo.

To solve the dual issues of restraining cargo items and deterring theft, some manufacturers have added integrated security cables to their luxury outdoor items. Disadvantageously, these cables increase the item's cost and create a scenario in which securing cargo involves a tangle of security cables and cargo restraints from each individual item the user wishes to transport. Moreover, the failure of the cable mechanism in such an item renders the item's theft-deterrent aspect inoperable and requires repairing the mechanism, replacing the entire item, or supplying an external method of security at additional cost.

Therefore, the market calls for a cargo restraint device that incorporates ease of use and storage while meeting the dual requirements of cargo restraint and cargo security for items of a variety of shapes and sizes.

SUMMARY OF INVENTION

The present invention overcomes many of the shortcomings and limitations of the prior art cargo restraint and security devices discussed above.

The invention is an easily portable locking cargo restraint, which uses two or more cables to secure one or more items to a base or surface. First, the device is an efficient restraint device because the cables can be individually pulled to different lengths so that the cables can restrain multiple items or irregularly shaped items. Second, the cables are retractably mounted within a central body for easy storage and retrieval, ensuring the user need not worry about tangled cable. Third, the retractable cables may be individually spring biased to pull the cables into the central body after use, efficiently stowing the cables with minimal user intervention. Finally, the cables themselves may have connectors, such as hooked ends, to engage with available mounting points on the base or surface used to secure the item. Alternatively, the connectors may engage with each other so that the cables surround both the cargo items and the base used to secure the items.

In addition, the device incorporates security mechanisms to deter item theft. The cables and tensioning mechanisms of the device are housed within a case to prevent unauthorized users from tampering with the device. Also, the device may feature a keyed lock that can prevent unauthorized users adjusting the cables' tension, preventing them from loosening the restraints to steal the items. Moreover, the cables themselves may be constructed of a cut-resistant material to deter theft.

These and other aspects and advantages of the present invention will become apparent to those skilled in the art after considering the following detailed description in connection with the accompanying drawings.

BRIEF DESCRIPTION OF DRAWINGS

For a better understanding of the various embodiments of the present invention, reference may be made to the accompanying drawings in which.

Figure 1:
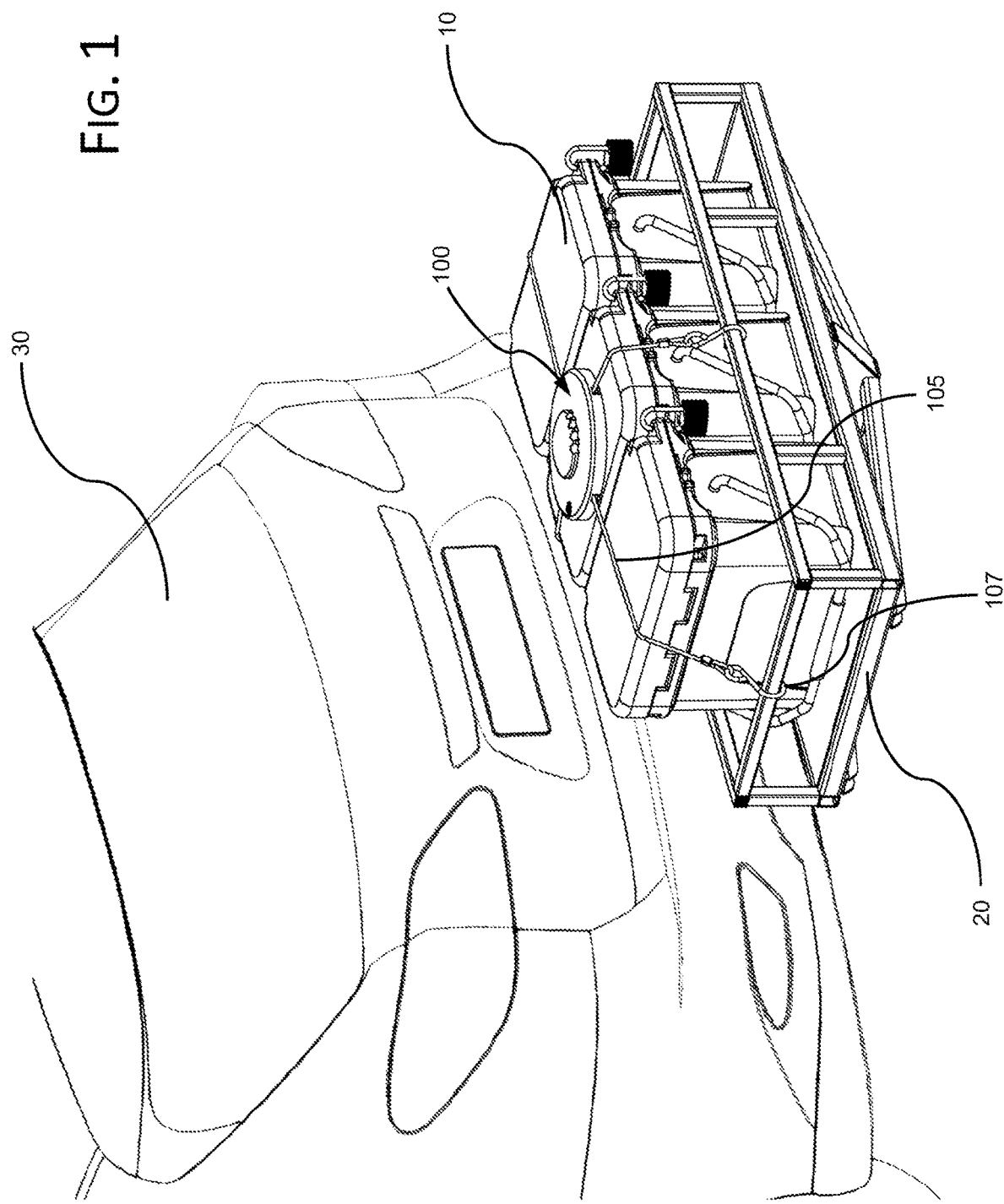
FIG. 1 is a perspective view of a locking cargo restraint with multiple retracting cables restraining cargo on the back of a representative passenger vehicle, the restraint constructed according to the teachings of the present invention.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

FIG. 1 illustrates a locking cargo restraint with multiple retracting cables 100, hereinafter referred to simply as cargo restraint 100, as installed to secure representative cargo items 10. As illustrated in this embodiment, a plurality of cables 105 of the cargo restraint 100 attach to a representative base 20, with the base 20 being affixed to a representative vehicle 30. In this embodiment, each of the cables 105 may extend to different lengths to allow the user to secure multiple cargo items. Here, the cables 105 are also equipped with connectors 107, shown as hooks in FIG. 1, that may be selectively engaged with a surface such as the base 20 when the connectors 107 are attached to the base 20.

Figure 2:
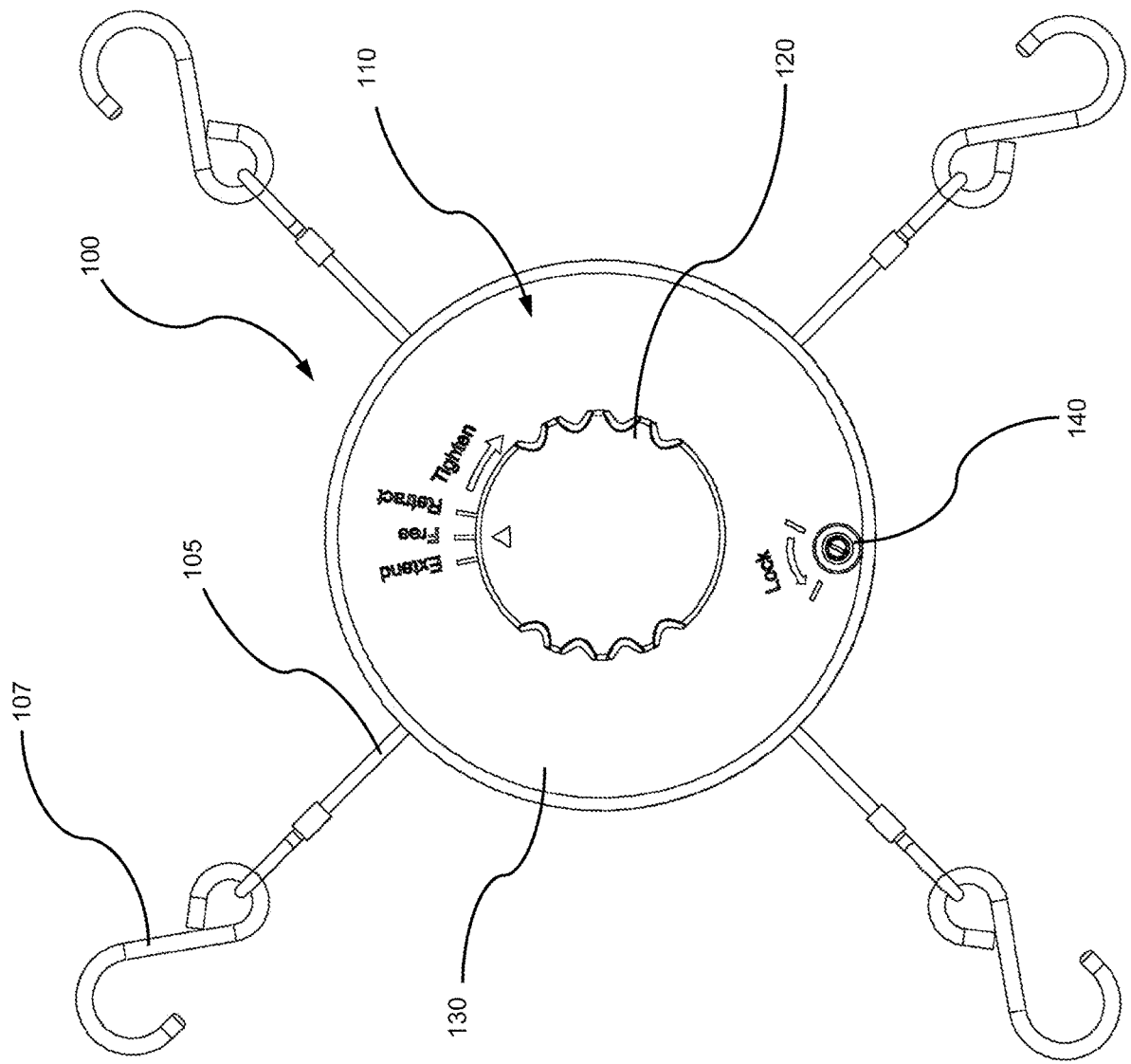
FIG. 2 is a top plan view of the locking cargo restraint with multiple retracting cables.
Figure 3:
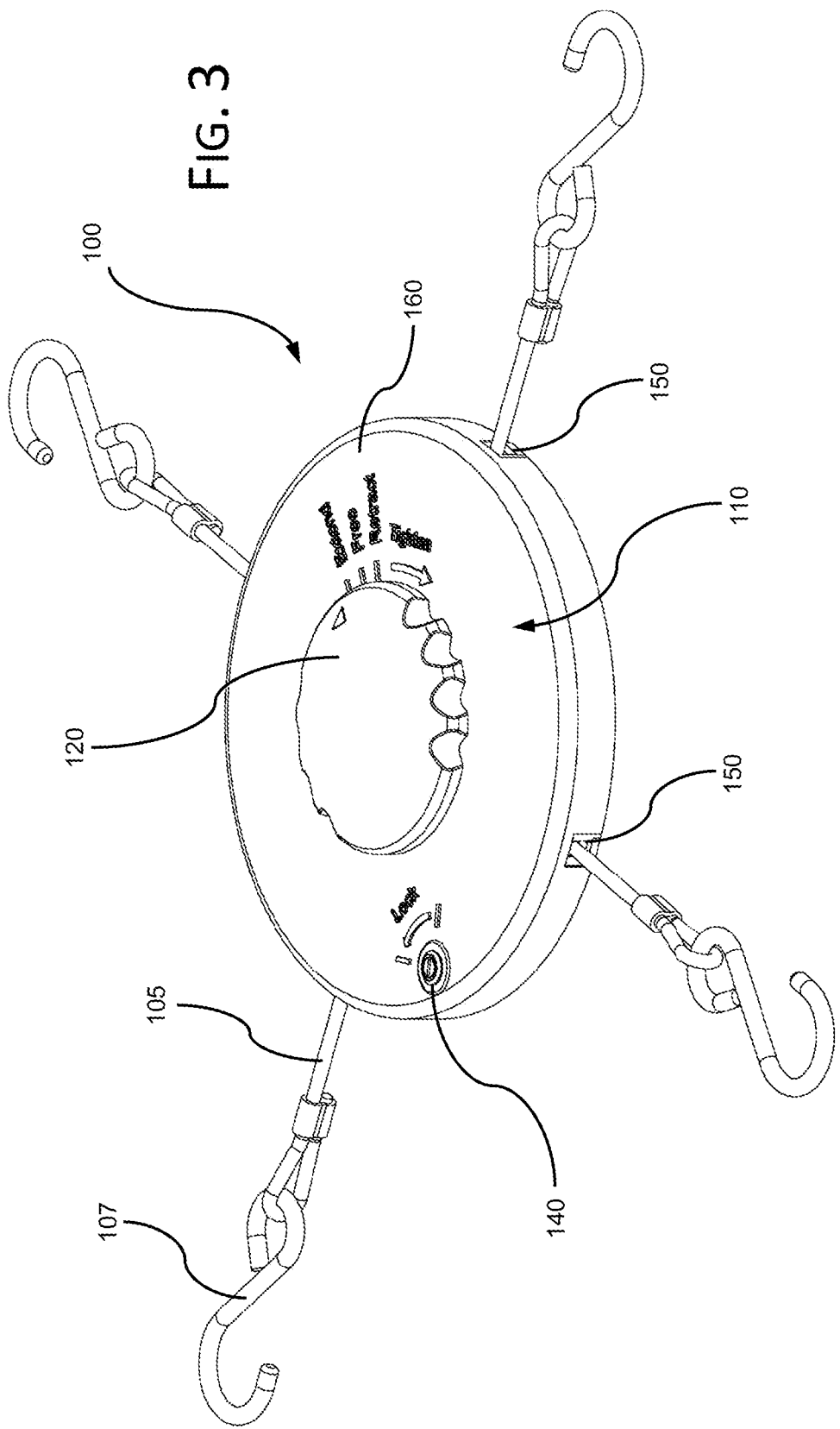
FIG. 3 is a top perspective view of the locking cargo restraint of FIG. 2.

FIGS. 2 and 3 illustrate a first embodiment of the cargo restraint 100. A case or cover 110 may be provided, with a mode selection knob 120 affixed to an exterior surface 130 of the case 110. The mode selection knob 120 may be rotated to select an operating mode from a number of possible operating modes. A keyed lock 140 may be used to prevent rotation of the mode selection knob 120 in a first direction, thereby preventing the cargo restraint 100 from engaging different operation modes without using a key (or other known or foreseeable unlocking means) to disable the keyed lock 140. As will be explained in greater detail herein below, the mode selection knob 120 and the keyed lock 140 preferably interface with various internal mechanisms of the cargo restraint 100 to allow the user to manipulate the cables 105 in a variety of ways.

Turning to FIG. 3, a plurality of apertures 150 extend from the interior of the case 110 to its exterior. The apertures 150 allow for a plurality of cables to exit the case 110. Preferably, two or more cables 105 extend from the case 110 via the apertures 150.

Figure 4:
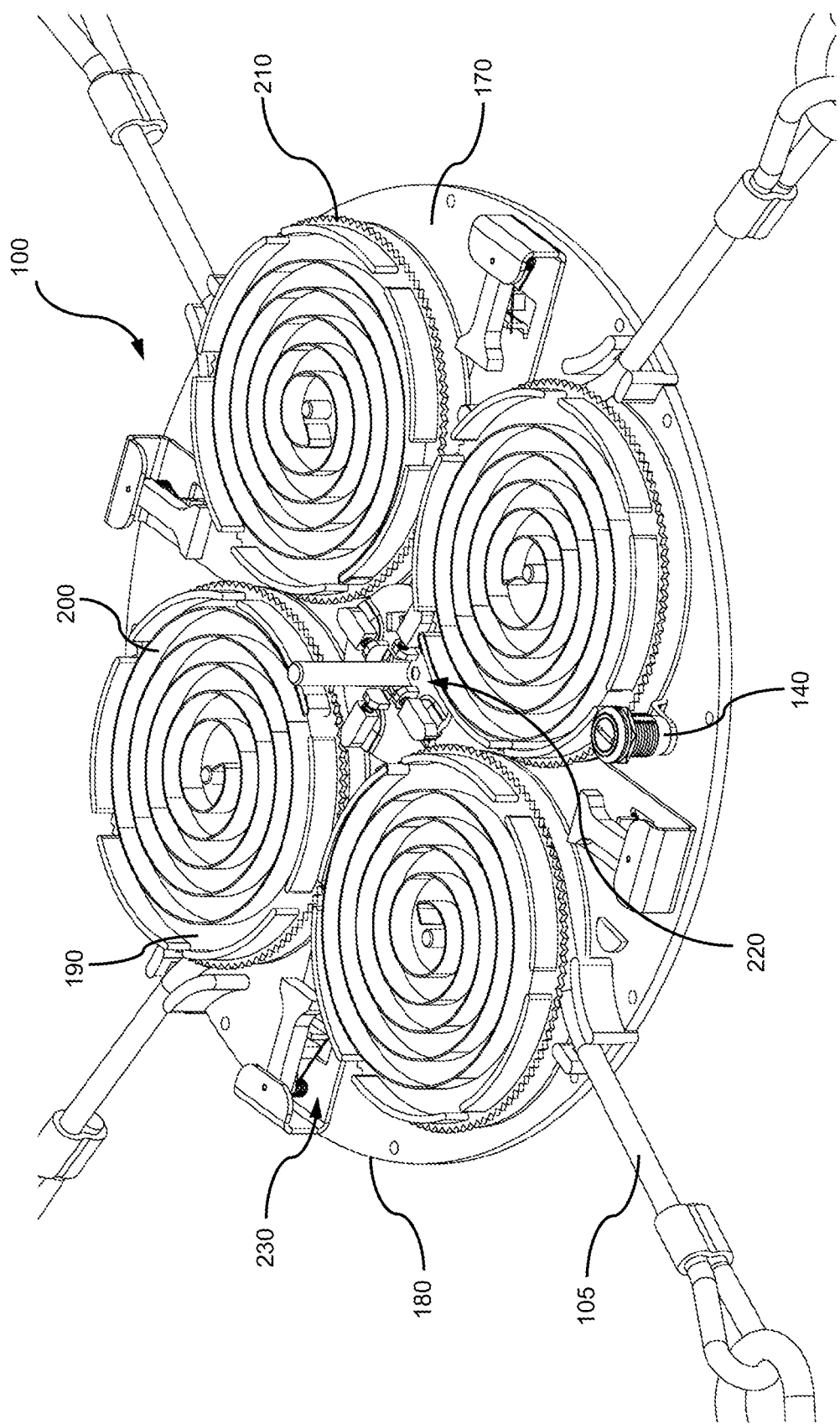
FIG. 4 is a top perspective view of interior mechanisms housed within a case of the cargo restraint of FIG. 2, the interior mechanisms including a selector assembly and a tensioner assembly.

Further, the case 110 may include a case top 160. FIG. 4 illustrates a case bottom 170, and when the case top 160 and the case bottom 170 are fastened together, they form a cylinder. The interior volume of this cylinder preferably houses the internal mechanisms of the cargo restraint 100.

FIG. 4 also illustrates these various internal mechanisms of the cargo restraint 100 once the case top 160 of the case 110 has been removed from the body 180 of the cargo restraint 100. The case bottom 170 may provide a mounting point for the mechanisms within the interior of the case, though such mechanisms may be mounted to the case top 160. In combination with the case top 160, the case bottom 170 protects the mechanisms from weather and tampering. In the embodiment captured in FIG. 4, the cargo restraint 100 includes four spools 190 which may rotate in either a first direction or a second direction. Also, each spool 190 may have a bias spring 200 that may apply torque to the spool 190 in a first direction that winds the cable 105 onto the spool 190. Further, each spool 190 may have a plurality of ratchet teeth 210 on its outside perimeter. The teeth 210 may be engaged by a tensioner assembly 220 to rotate the spools 190 and further retract the cables 105 into the interior housing of the spools 190.

Figure 13:
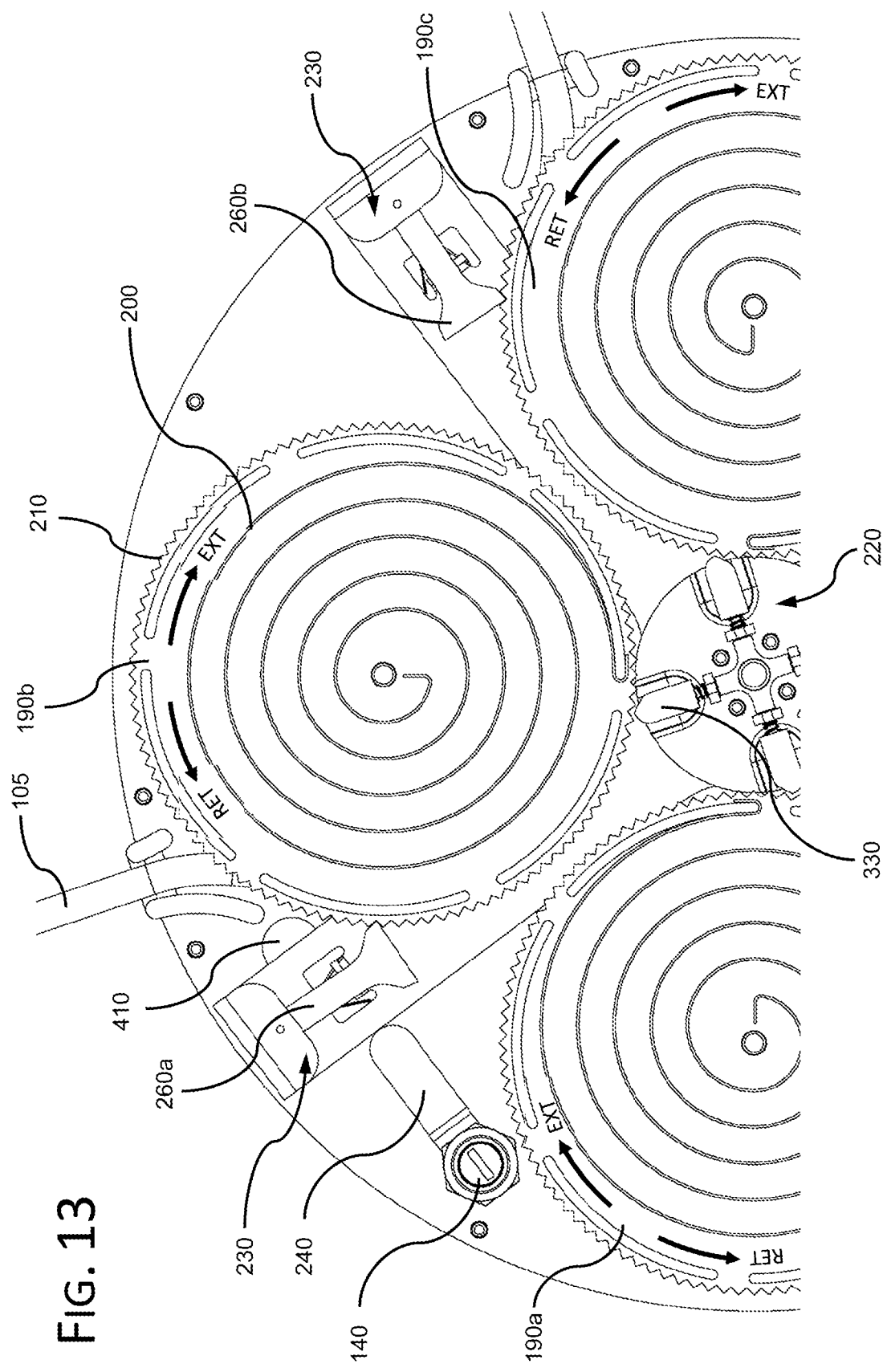
FIG. 13 is a partial top plan view of the interior mechanisms of the cargo restraint of FIG. 4 when the device is in the retract mode and a keyed lock is in a locked position.

The cargo restraint 100 may also include a selector assembly 230 that may engage with the teeth 210 to limit rotation of the spools 190. The selector assembly 230 is preferably operationally coupled to the mode selection knob 120. Thus, the selector assembly 230 may change position within the case 110 as a user selects different modes of operation via the mode selection knob 120. Moreover, the selector assembly 230 can be locked into position by the keyed lock 140. The keyed lock 140 may include a lock arm 240, which can rotate when engaged by the user to prevent the selector assembly 230 from releasing the spools 190 (as illustrated in FIG. 13).

Figure 5:
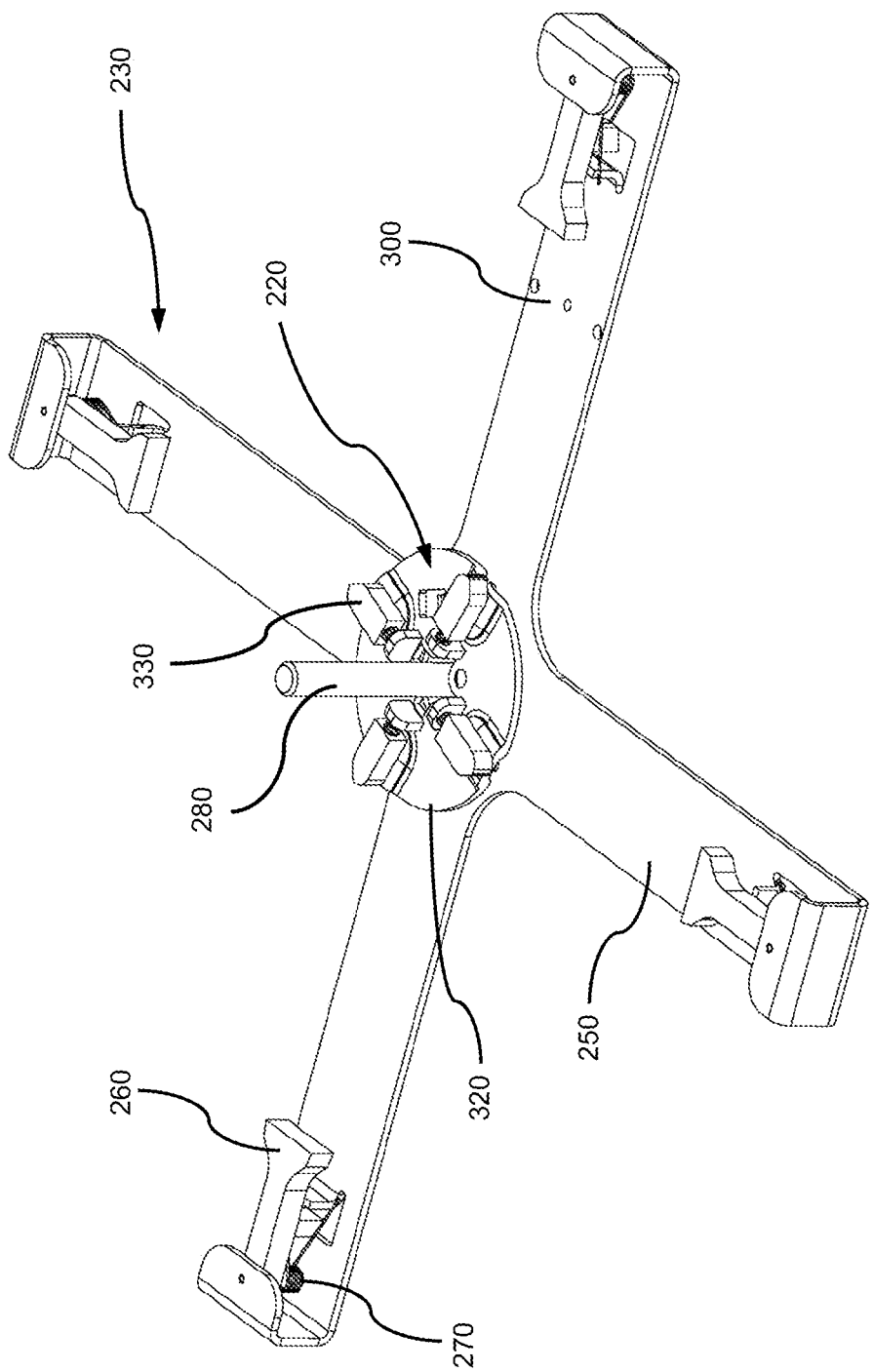
FIG. 5 is a top perspective view of the selector assembly and the tensioner assembly of FIG. 4.
Figure 6:
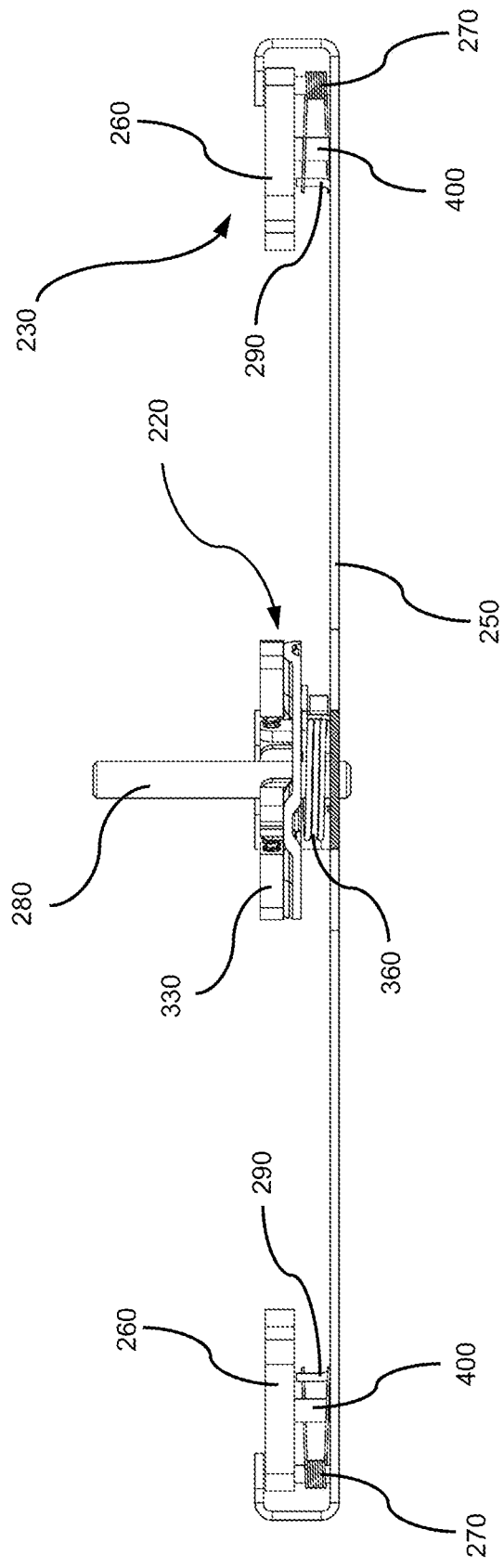
FIG. 6 is a cross-section view of the selector assembly and the tensioner assembly of FIG. 5.

FIGS. 5 and 6 illustrate one embodiment of the selector assembly 230 and tensioner assembly 220. In this embodiment, the selector assembly 230 is generally comprised of selector arms 250, selector pawls 260, and selector springs 270. The selector assembly 230 rotates about a selector shaft 280. The pawls 260 may be mounted on pivots at the ends of the selector arms 250. A selector spring 270 on the same pivot as the pawl 260 preferably provides a restorative torque when the pawl 260 is deflected in either a first or a second direction. A selector spring tab 290 may prevent one side of the selector spring 270 from rotating with the selector pawl 260 and the other side of the selector spring 270. Thus, the selector spring 270 may apply a restorative force to the selector pawl 260. Selector detent holes 300 provide "seats" for a detent plunger 310 (not pictured) to settle into and resist an accidental change in operational mode.

The tensioner assembly 220, in this embodiment, is rigidly fixed to the mode selection knob 120, and the mode selection knob 120 pivots on the selector shaft 280. The tensioner assembly 220 may include a tensioner body 320, tensioner pawls 330, and a tensioner tab 350 (tensioner tab 350 not illustrated in FIGS. 5 and 6). The tensioner assembly 220 and the selector assembly 230 are mechanically connected by a tensioner spring 360 and a series of travel stops composed of the tensioner tab 350, a tensioner stop 370, and a selector tab 380 (travel stops not illustrated in FIGS. 5 and 6). The tensioner assembly 220, via the selector assembly 230, is mechanically coupled to the mode selection knob 120 via the selector shaft 280. Thus, when the mode selection knob 120 is turned in a "Tighten" direction, the tensioner pawls 330 engage the spools 190, applying added tension to the cables 105.

Figure 7:
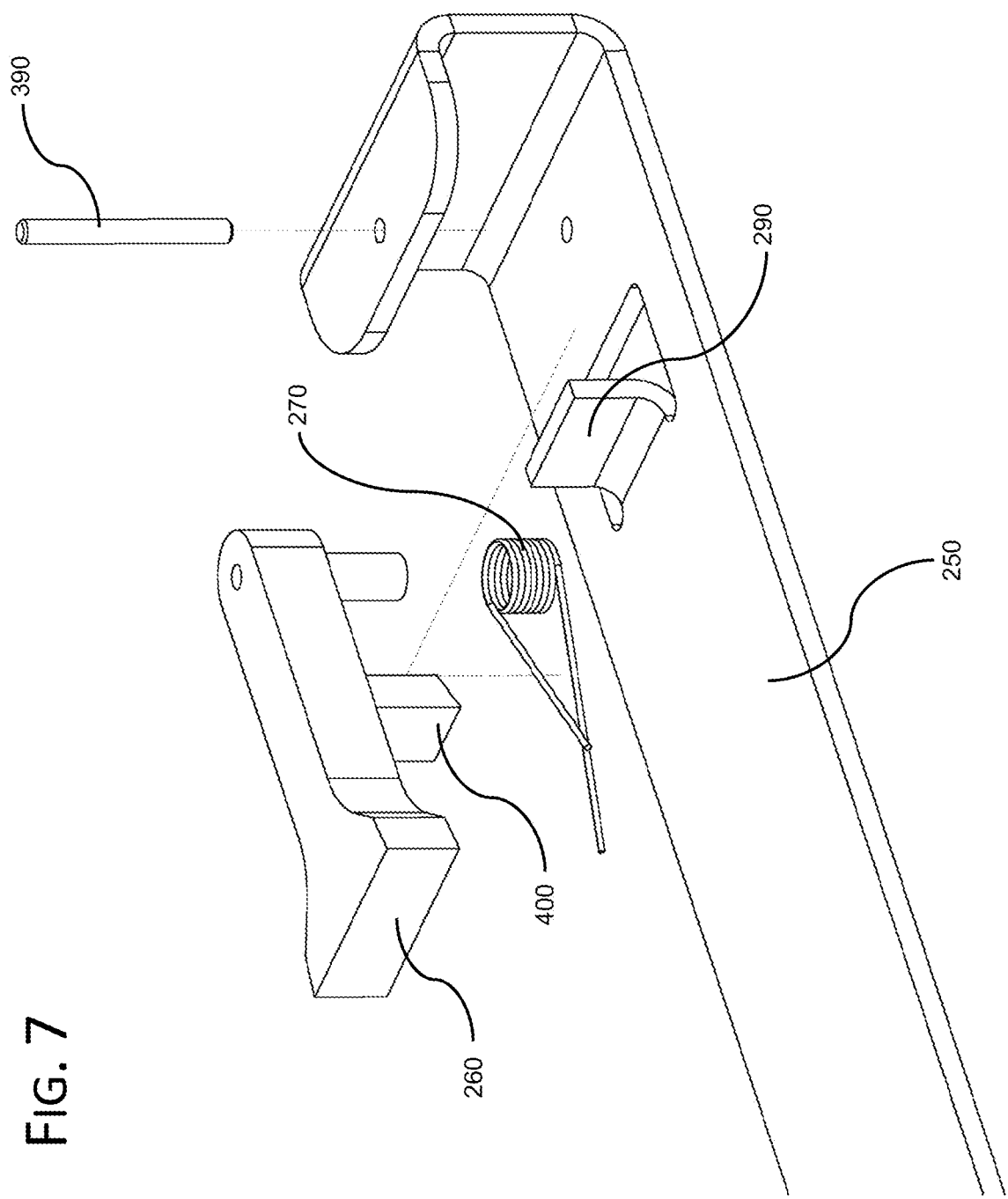
FIG. 7 is an exploded view of a selector pawl as assembled to a selector arm of FIG. 4.

FIG. 7 provides an exploded detail view of a selector pawl 260. The components illustrated in FIG. 7 help couple the pawl 260 to the selector arm 250. A pawl pivot shaft 390 is preferably inserted through the folded end of the selector arm 250 and the pawl 260, forming a pivot for the pawl 260. The portion of the pawl 260 through which the pivot shaft 390 is inserted is itself inserted into the body of the selector spring 270. The arms of the selector spring 270 are placed on the opposite sides of the selector spring tab 290 and a pawl spring tab 400. Thus, when the end of the pawl 260 is deflected, the selector spring 270 will apply force to the selector spring tab 290 and the pawl spring tab 400 in a direction to restore the pawl 260 to a neutral position.

Figure 8:
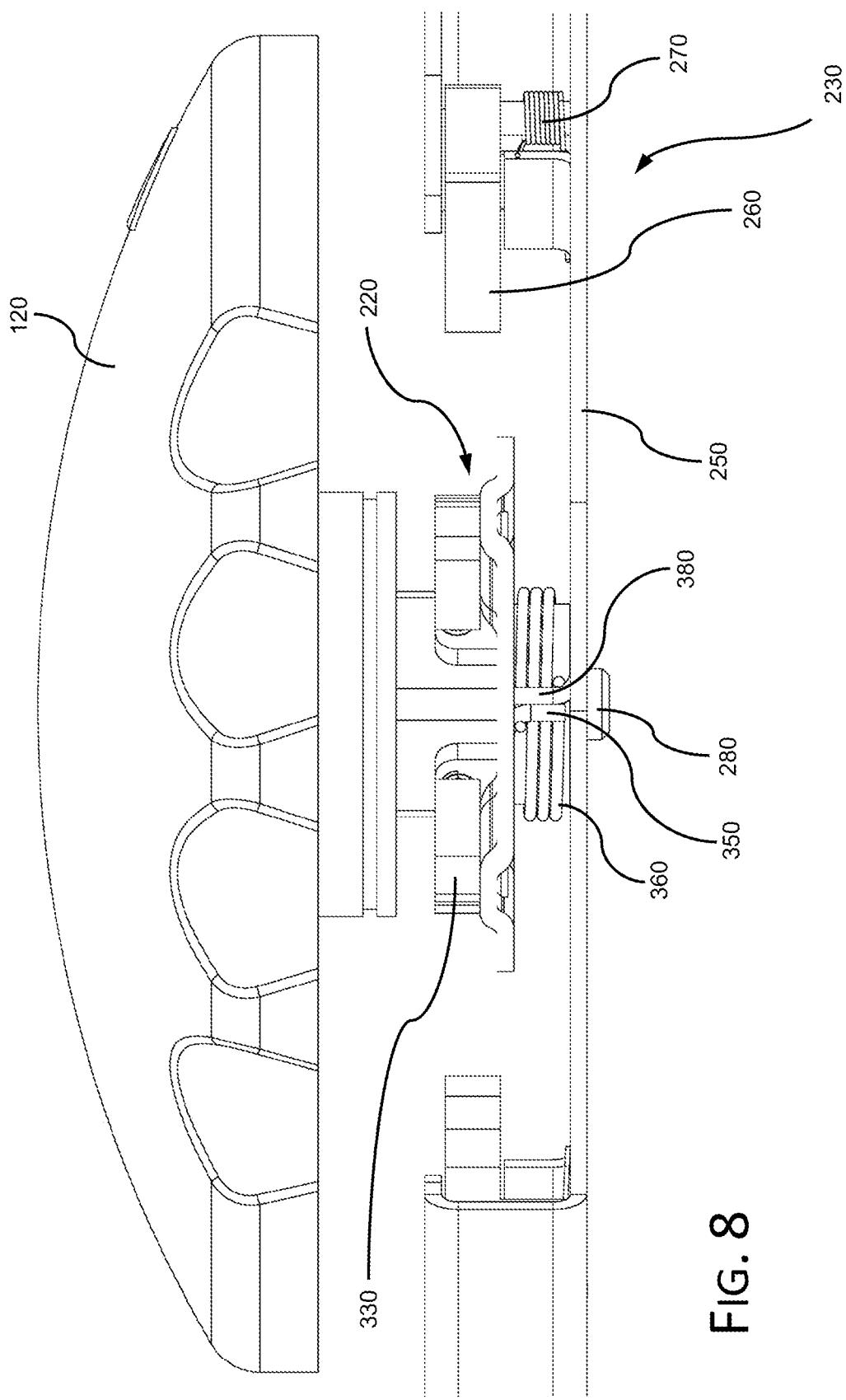
FIG. 8 is a cross section of the tensioner assembly and a selector arm of FIG. 4 with a mode selection knob shown.

FIG. 8 illustrates the mode selection knob 120 coupled to the tensioner assembly 220 and the selector assembly 230. Screws or other fastening means that would be appreciated by those in the art may rigidly attach the mode selection knob 120 to the tensioner assembly 220. The tensioner assembly 220 may rotate in each a first direction and a second direction. The tensioner tab 350 of the tensioner assembly 220 engages the selector tab 380 to limit the rotation of the tensioner assembly 220 in a first direction relative to the selector assembly 230. The tensioner spring 360, as shown, is a torsional spring that engages the tensioner tab 350 and selector tab 380 to transmit torque in the second direction from the tensioner assembly 220 to the selector assembly 230. The tensioner spring 360 applies a preload to the tensioner tab 350 and the selector tab 380, which keeps them in contact with one another as the mode selection knob 120 is turned. In this embodiment, when the tensioner spring 360 preload is exceeded, the tensioner assembly 220 may turn in the second direction separately from the selector assembly 230.

Figure 9:
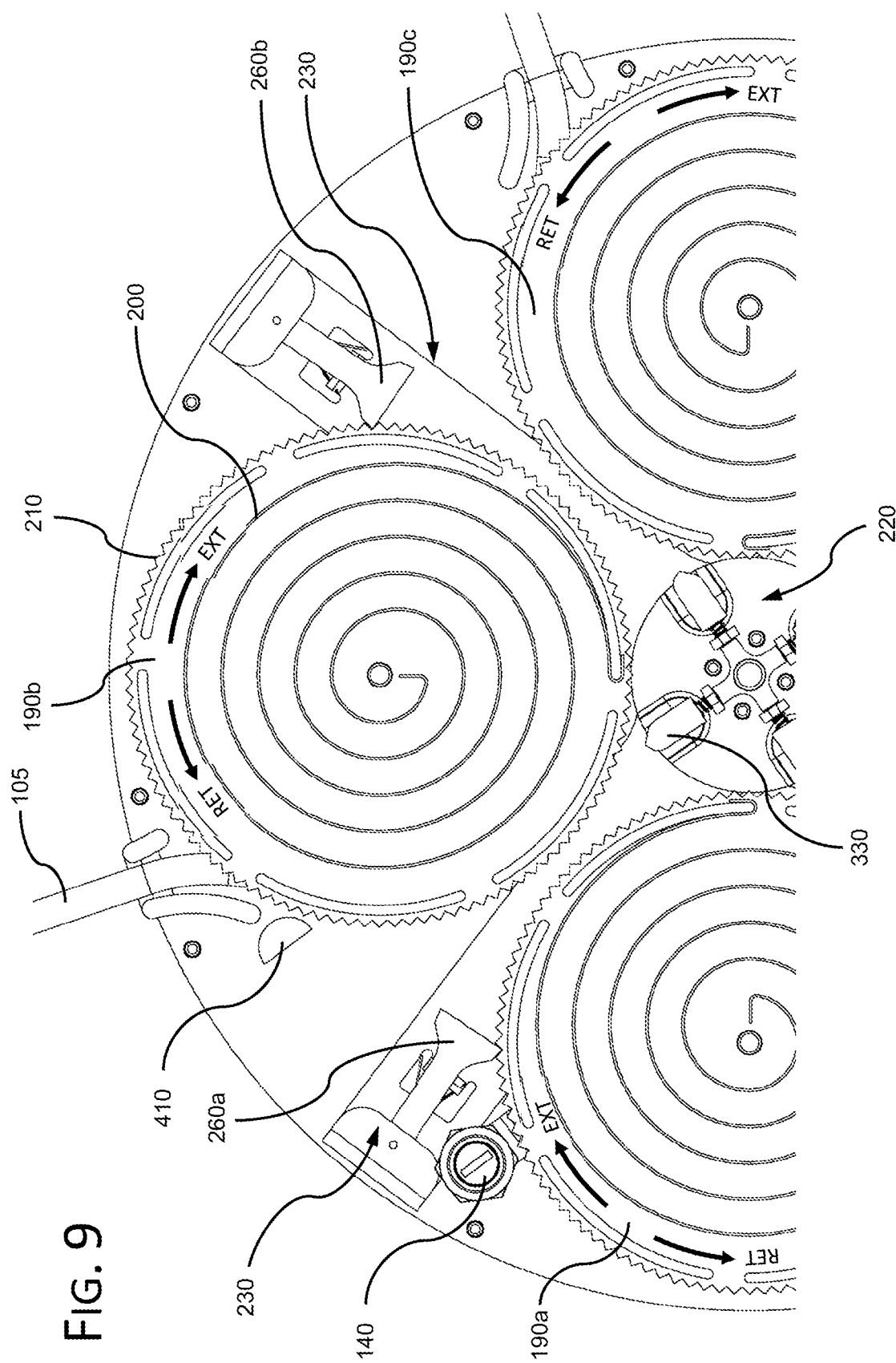
FIG. 9 is a partial top plan view of the interior mechanisms of the cargo restraint of FIG. 4 when the device is in an extend mode.
Figure 10:
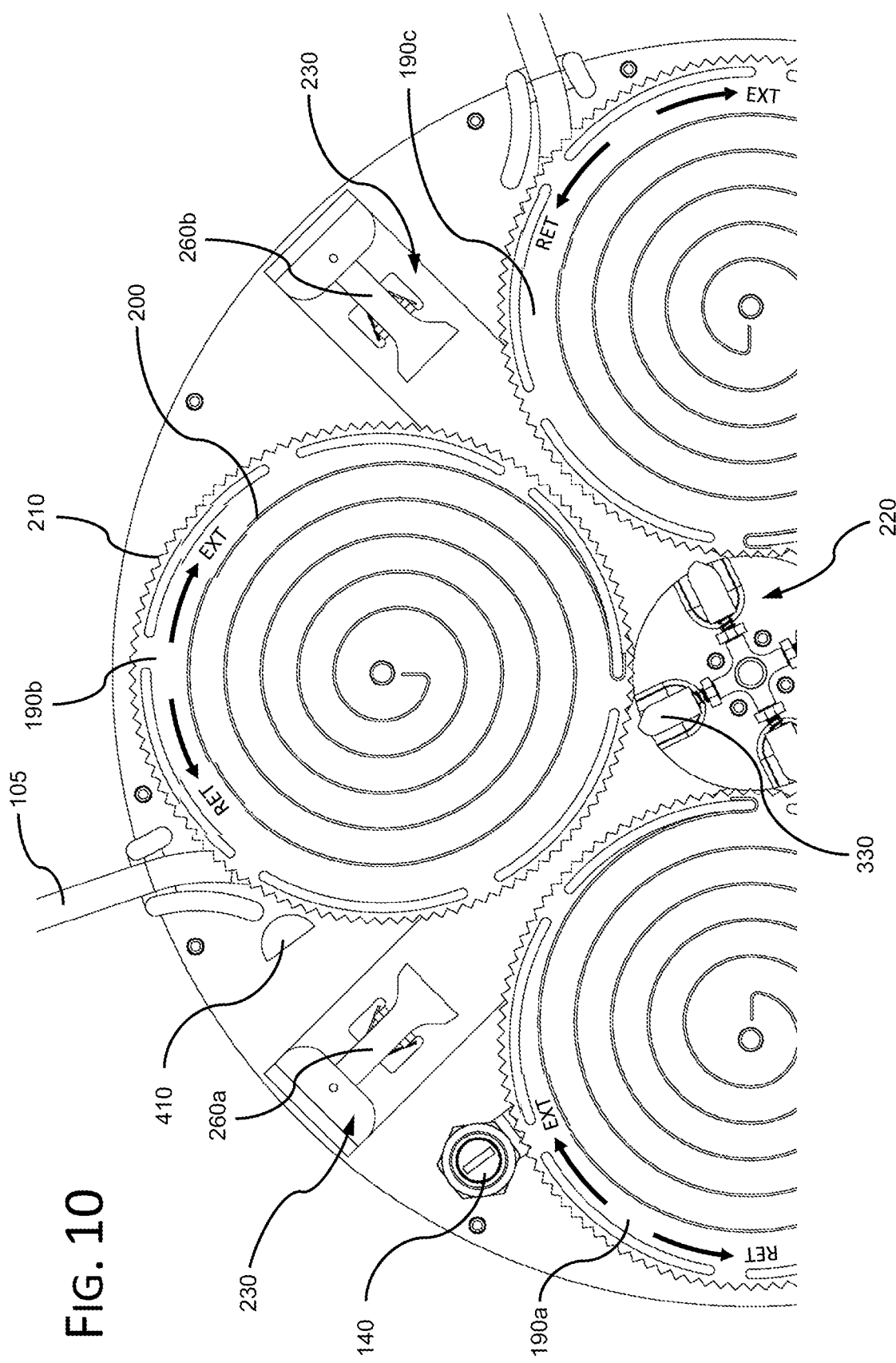
FIG. 10 is a partial top plan view of the interior mechanisms of the cargo restraint of FIG. 4 when the device is in a free mode.
Figure 11:
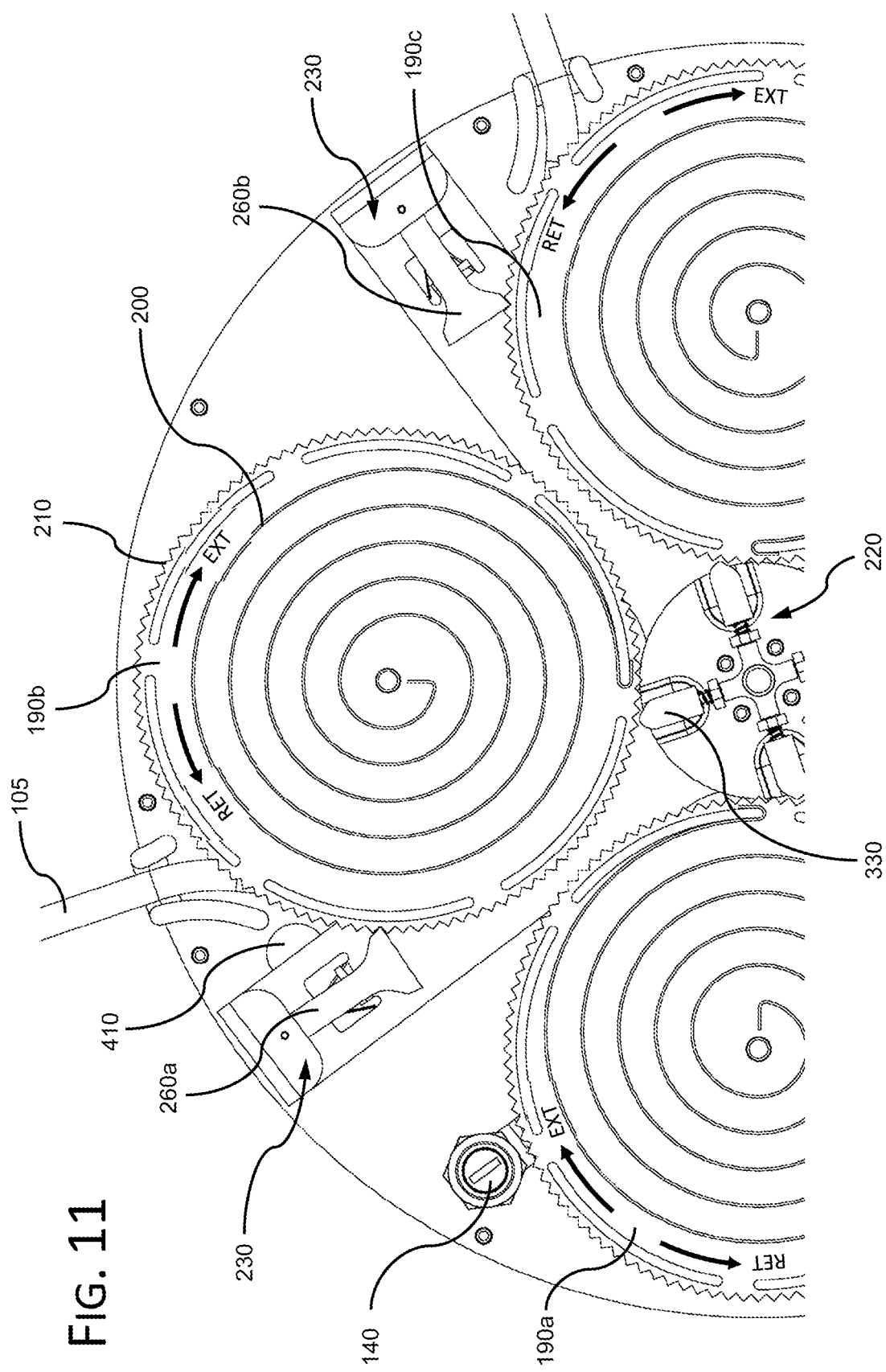
FIG. 11 is a partial top plan view of the interior mechanisms of the cargo restraint of FIG. 4 when the device is in a retract mode.

FIGS. 9, 10, and 11 illustrate a first, a second, and a third position of the selector assembly 230. The movement of the selector assembly 230 to these positions corresponds with an "Extend" mode, a "Free" mode, and a "Retract" mode of operation for the cargo restraint 100. The "Extend" mode allows the cables 105 to be unspooled while simultaneously preventing the cables 105 from retracting into the body of the cargo restraint 100, the "Free" mode allows the cables 105 to move in or out of the body of the cargo restraint 100, and the "Retract" mode allows the cables 105 to retract into the body of the cargo restraint 100 while preventing them from being extended.

In FIG. 9, the selector assembly 230 is in the first position, corresponding in this embodiment to the "Extend" mode of the cargo restraint 100. In this mode, the selector assembly 230 is rotated in a first direction so that the selector pawls 260a and 260b engage the ratchet teeth 210 of the spools 190a and 190b to prevent the spools from rotating in the direction of cable 105 retraction. In this mode, the bias springs 200 cannot rotate the spools 190 to retract the cables 105, and the tensioner pawls 330 do not engage the ratchet teeth 210.

In FIG. 10, the selector assembly 230 is in the second position, corresponding in this embodiment to the "Free" mode of operation of the cargo restraint 100. In this mode, the selector assembly 230 rests in the second position such that the selector pawls 260a and 260b do not engage the ratchet teeth 210 of the spools 190a, 190b, and 190c. Also, the tensioner pawls 330 do not engage the ratchet teeth 210. In this mode, the spools 190 are free to rotate and the bias springs 200 will rotate the spools 190 to retract the cables 105 unless external tension is applied to the cables 105.

In FIG. 11, the selector assembly 230 is in the third position, corresponding in this embodiment to the "Retract" mode of operation of the cargo restraint 100. In this mode, the selector assembly 230 has been rotated in the second direction so that the selector pawls (260a, 260b) engage the ratchet teeth 210 of the spools 190b, 190c to prevent the spools 190 from rotating in the direction of cable 105 extension. In this mode, the bias springs 200 can rotate the spools 190 to retract the cables 105, but tension applied to the cables 105 externally cannot rotate the spools 190 to extend the cables 105. Further, in this mode, the tensioner pawls 330 do not engage the ratchet teeth 210.

Figure 12:
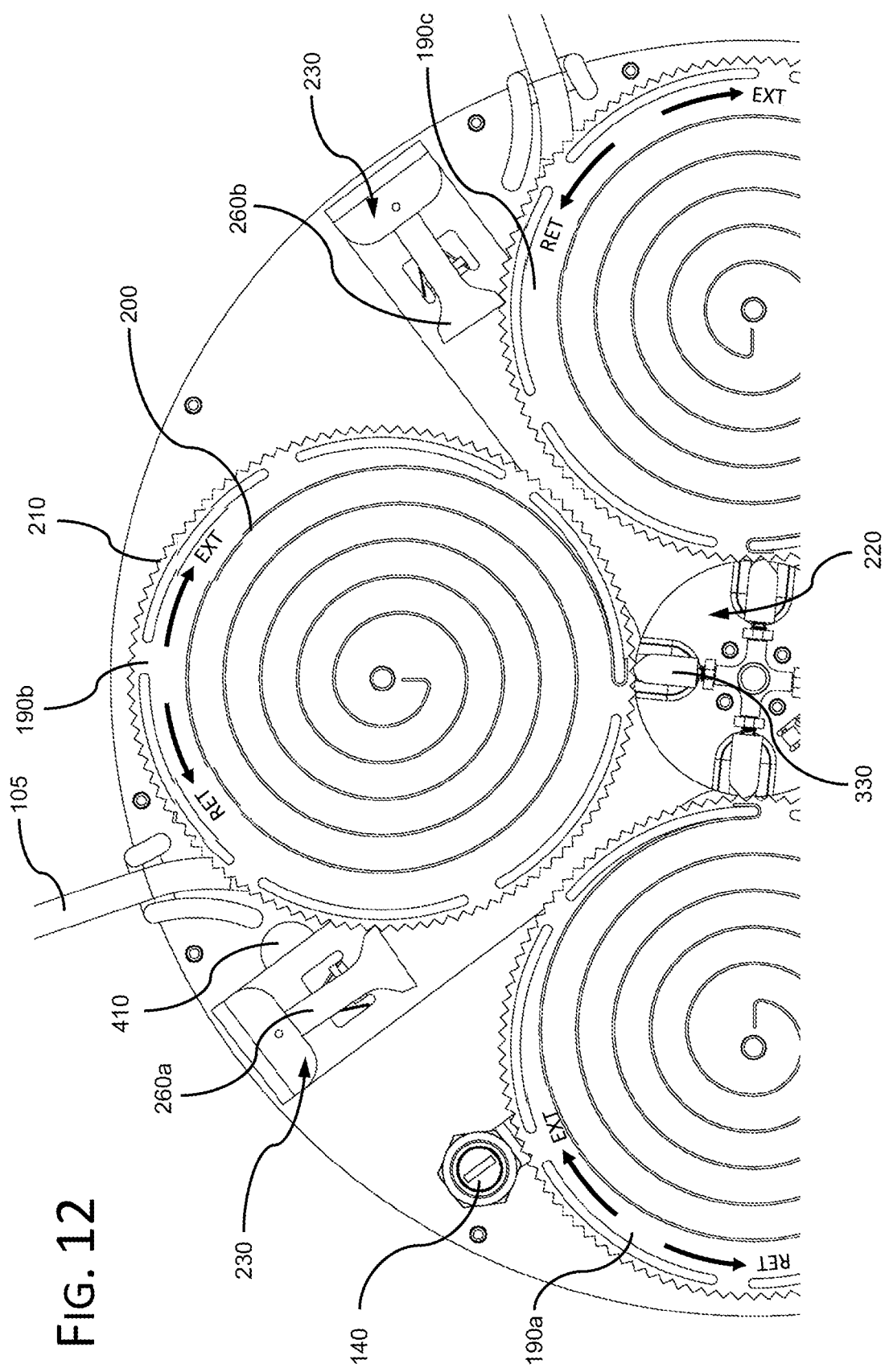
FIG. 12 is a partial top plan view of the interior mechanisms of the cargo restraint of FIG. 4 when the device is in a tighten mode.

In FIG. 12, the mode selection knob 120 is turned in the "Tighten" direction, which allows the user to manually add tension to the cables 105. In this mode, the selector assembly 230 is in the third position, the same position as seen in the "Retract" mode of FIG. 11. A selector stop 410 prevents the selector assembly 230 from rotating in the second direction past the "Retract" position. The tensioner spring 270 allows the tensioner assembly 220 to continue rotating and engage the ratchet teeth 210 with the tensioner pawls 330. As the operator continues to rotate the mode selection knob 120 in the "Tighten" direction, the tensioner pawls 330 on the tensioner assembly 220 rotate the spools 190 in the direction of retraction, applying additional tension to the cables 105.

The keyed lock 140 may be set to a locked position and an unlocked position. FIG. 12 illustrates the keyed lock 140 in the unlocked position, while FIG. 13 shows the keyed lock 140 set to the locked position. As the keyed lock 140 is moved from the unlocked to the locked position, a lock arm 240 is rotated. In the locked position, the lock arm 240 is situated such that it prevents the selector assembly 230 from leaving the "Retract" position.

Figure 14:
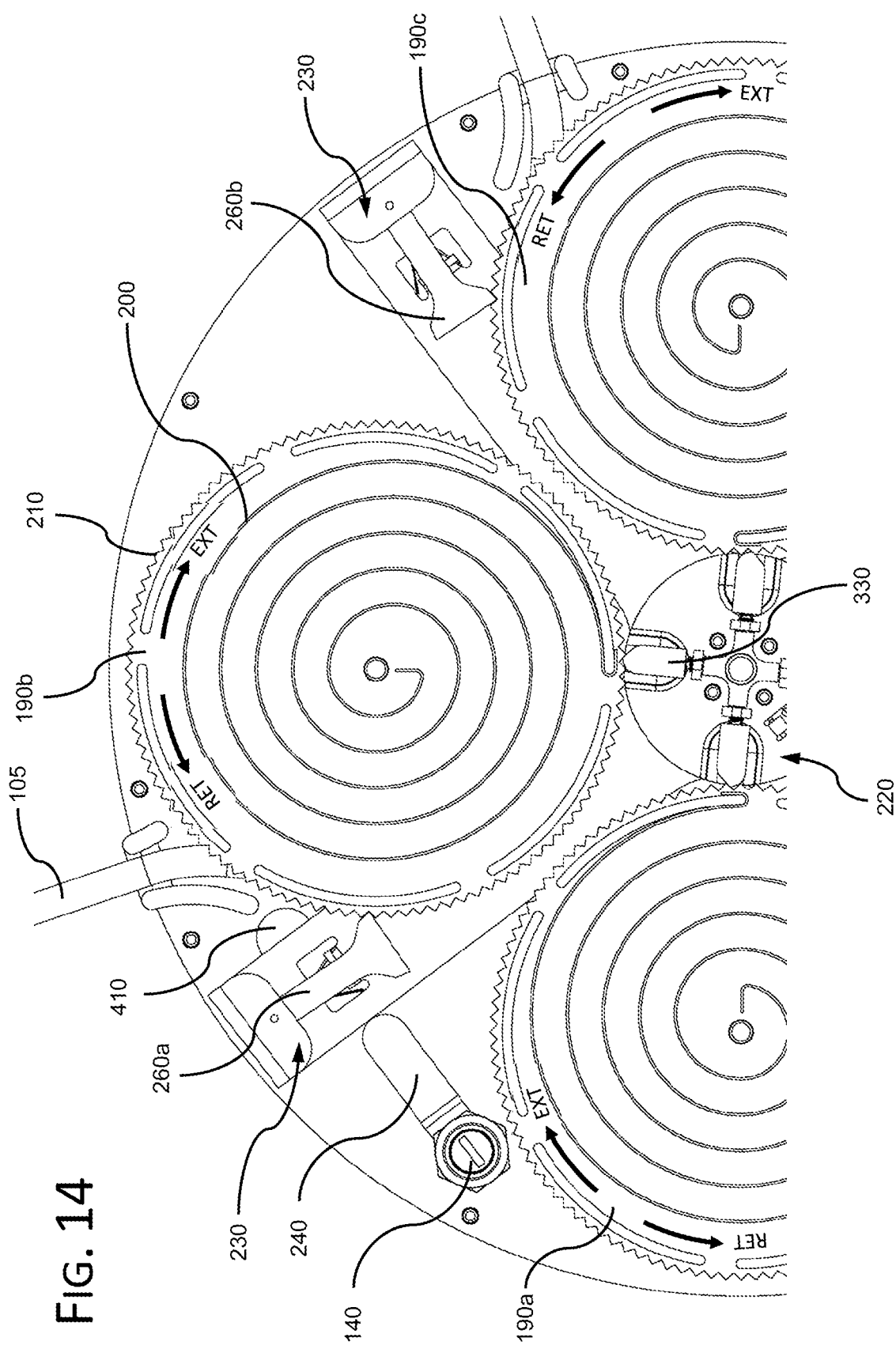
FIG. 14 is a partial top plan view of the interior mechanisms of the cargo restraint of FIG. 4 when the device is in the tighten mode.

FIG. 14 illustrates the interior of the cargo restraint 100 when the keyed lock 140 is set to the locked position, and the mode selection knob 120 is turned in the "Tighten" direction. In this configuration, the mode selection knob 120 can be used to tighten the cables 105 even when the keyed lock 140 is already set to the locked position. The selector stop 410 prevents the selector assembly 230 from rotating in the second direction while the lock arm 240 prevents the selector assembly 230 from rotating in the first direction. At the same time, the spools 190 are prevented from rotating in the second direction so that the tension on the cables 105 is not released.

Figure 15:
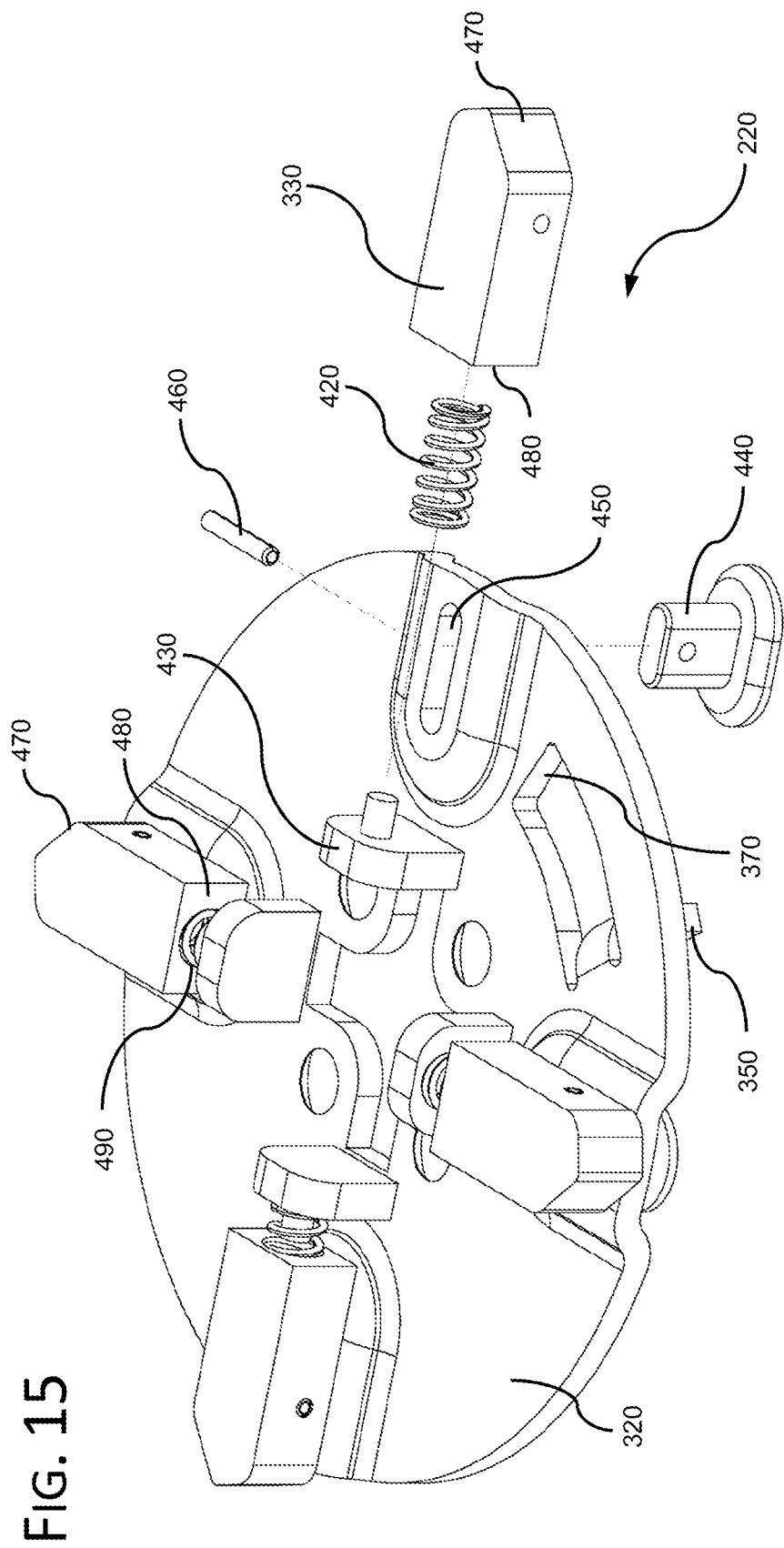
FIG. 15 is an exploded view of one embodiment of the tensioner assembly of FIG. 4.

FIG. 15 is an exploded detail view of one embodiment of the tensioner assembly 220. In this embodiment, the tensioner assembly 220 is comprised of a tensioner body 320 with tensioner pawls 330 and their accompanying mechanisms. A spring 420 is inserted into each tensioner pawl 330, and both the spring 420 and tensioner pawl 330 slide over a post on a spring guide 430. A pawl guide 440 may then be inserted through a slot 450 in the tensioner body 320 and pinned to the tensioner pawl 330 via a pin 460. The spring 420 preloads the tensioner pawl 330 radially outward from the tensioner body 320 and against the end of the slot 450.

The tensioner pawl 330 may include a front end 470 and a back end 480. In this embodiment, the back end 480 of the tensioner pawl 330 contains an aperture 490 such that the spring 420 may be inserted into the body of the pawl 330 via the aperture 490. The tensioner pawl 330 and the spring 420 may then be coupled to the tensioner assembly 220 as described in the preceding paragraph.

When the tensioner assembly 220 rotates in a second direction relative to the selector assembly 230, the tensioner pawls 330 can engage the ratchet teeth 210 of the spools 190. As the tensioner assembly 220 continues to rotate relative to the selector assembly 230, the tensioner pawls 330 slide in the slots 450 to allow them to follow the curvature of the spools 190. The springs 420 apply a force to maintain engagement between the tensioner pawls 330 and the ratchet teeth 210.

The surface of the front end 470 of the pawl 330 features a tapered shape. The tapered shape of the front end of the pawl 330 and force applied by the spring 420 may be designed such that the tensioner pawls 330 will skip over ratchet teeth 210 when a predetermined level of tension is present in the cables 105. This design allows the cables 105 to attain the predetermined level of tension without over-tensioning any individual cable 105. The tensioner pawl 330 ends are shaped such that they can easily skip over ratchet teeth 210 when the tensioner assembly 220 is rotated in the first direction as the mode selection knob 120 returns to the "Retract" position.

Figure 16:
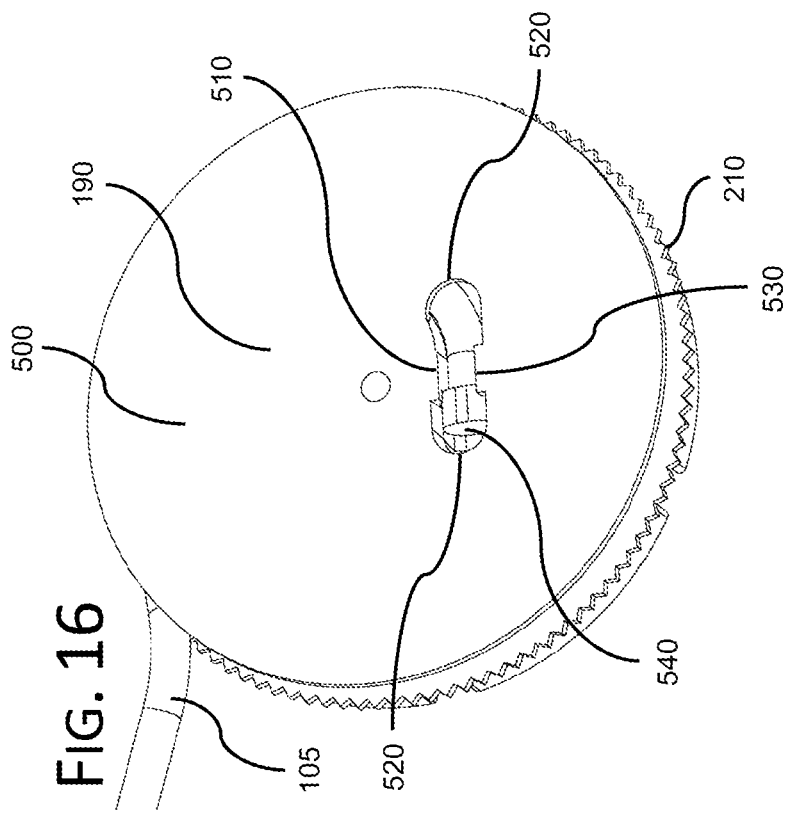
FIG. 16 is a bottom perspective view of a spool of FIG. 4.

FIG. 16 provides a bottom perspective view of the spool 190. The spool 190 features a bottom surface 500 that features an aperture 510. In this embodiment, the aperture 510 features two end portions 520 and a center portion 530. The two end portions 520 are wider than the center portion 530, and the two end portions 520 have substantially the same diameter. Thus, the end portions 520 and the center portion 530 of the aperture 510 create a barbell-type shape.

One end of the cable 105 is fed through the aperture 510; this end of the cable 105 is equipped with a cable stop 540. The cable stop 540 may be an open cylinder that is attached to the cable 105 via a fastening means. The cable stop 540 is narrower than the two ends of the aperture, but is wider than the center portion of the aperture. Therefore, the cable stop 540 catches on the center portion 530 of the aperture 510 to prevent the cable 105 from unwinding completely from, or slipping on around, the spool 190. The embodiment illustrated in FIG. 16 is just one method known in the art to connect a cable end to a rotating body.

Figure 17:
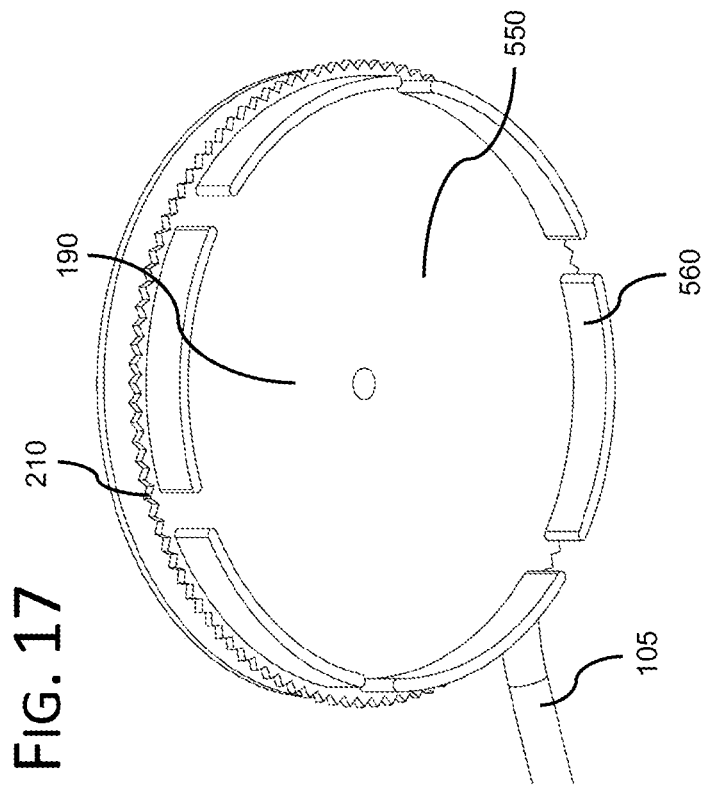
FIG. 17 is a top perspective view of the spool of FIG. 16.

FIG. 17 is a top perspective view of the spool 190. The spool 190 has a top surface 550. The top surface 550 of the spool 190 has spring restraints 560 arranged around its periphery to prevent the bias spring 200 (not illustrated) from impinging on other parts of the internal mechanism of the cargo restraint 100. The free end of the bias spring 200 acts against one end of a spring restraint 560 to apply a retracting force to the spool 190.

Figure 18:
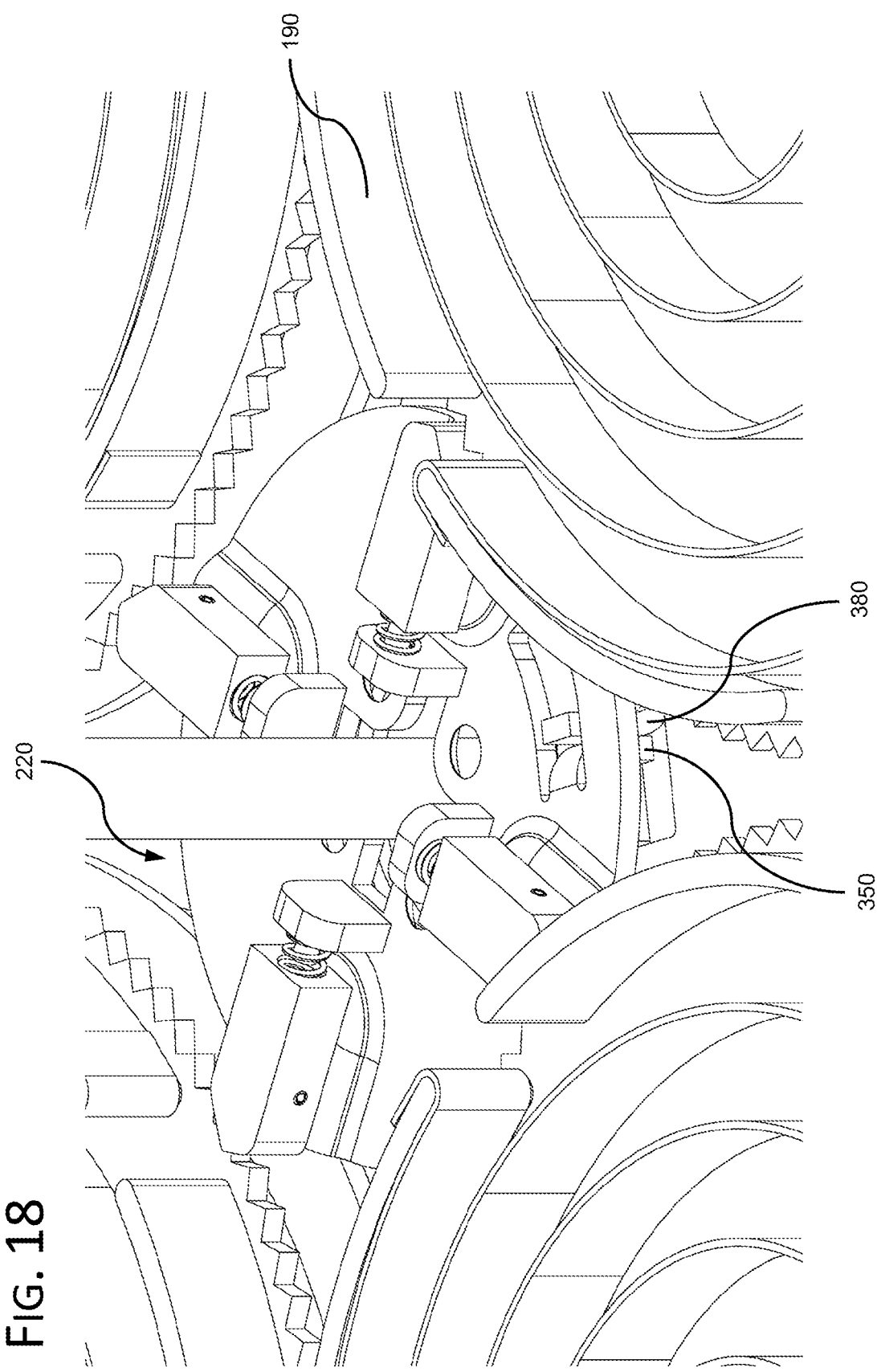
FIG. 18 is a partial top perspective view of the tensioner assembly of FIG. 11.

FIG. 18 is a top perspective view of the tensioner assembly 220 as installed in the cargo restraint 100. In this drawing, the mode selection knob 120 is set to "Retract," which allows the cables 105 to retract into the spool 190 while preventing the cables 105 from being pulled out of the spool 190. Here, the tensioner tab 350 rests against the selector tab 380 under the preload torque of the tensioner spring 360 (not illustrated).

Figure 19:
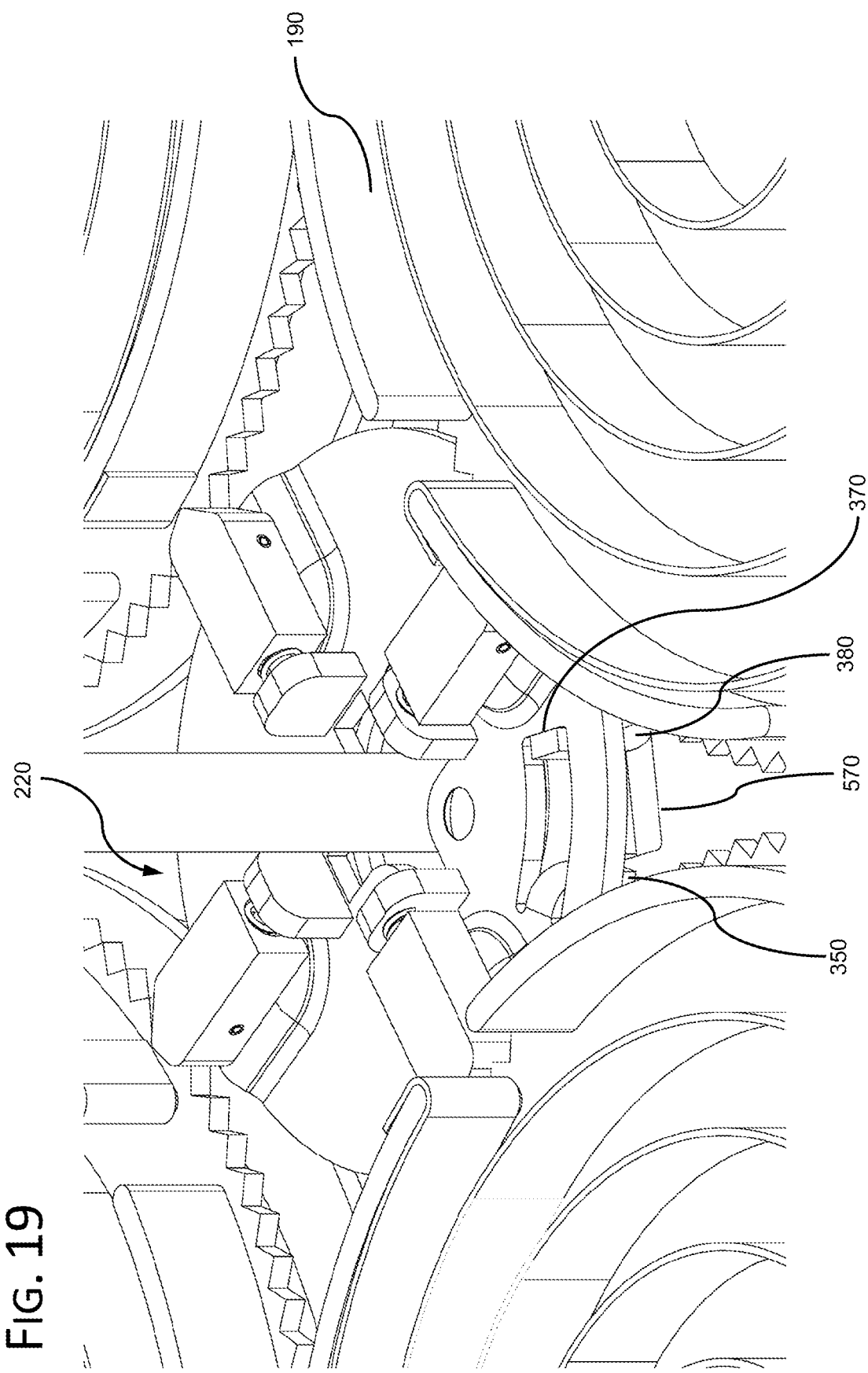
FIG. 19 is a partial top perspective view of the tensioner assembly of FIG. 12.

FIG. 19 is a top perspective view of the tensioner assembly 220 with the mode selection knob 120 being rotated in the "Tighten" direction by the operator. The selector tab 380 and the selector assembly 230 are kept stationary by the selector stop 410, while the tensioner assembly 220 has been rotated in the second direction against the tensioner spring 360, opening a gap 570 between the tensioner tab 350 and the selector tab 380. The tensioner assembly 220 is prevented from rotating further when the selector tab 270 engages the tensioner stop 370 at the end of the slot in the tensioner body 320.

Figure 20:
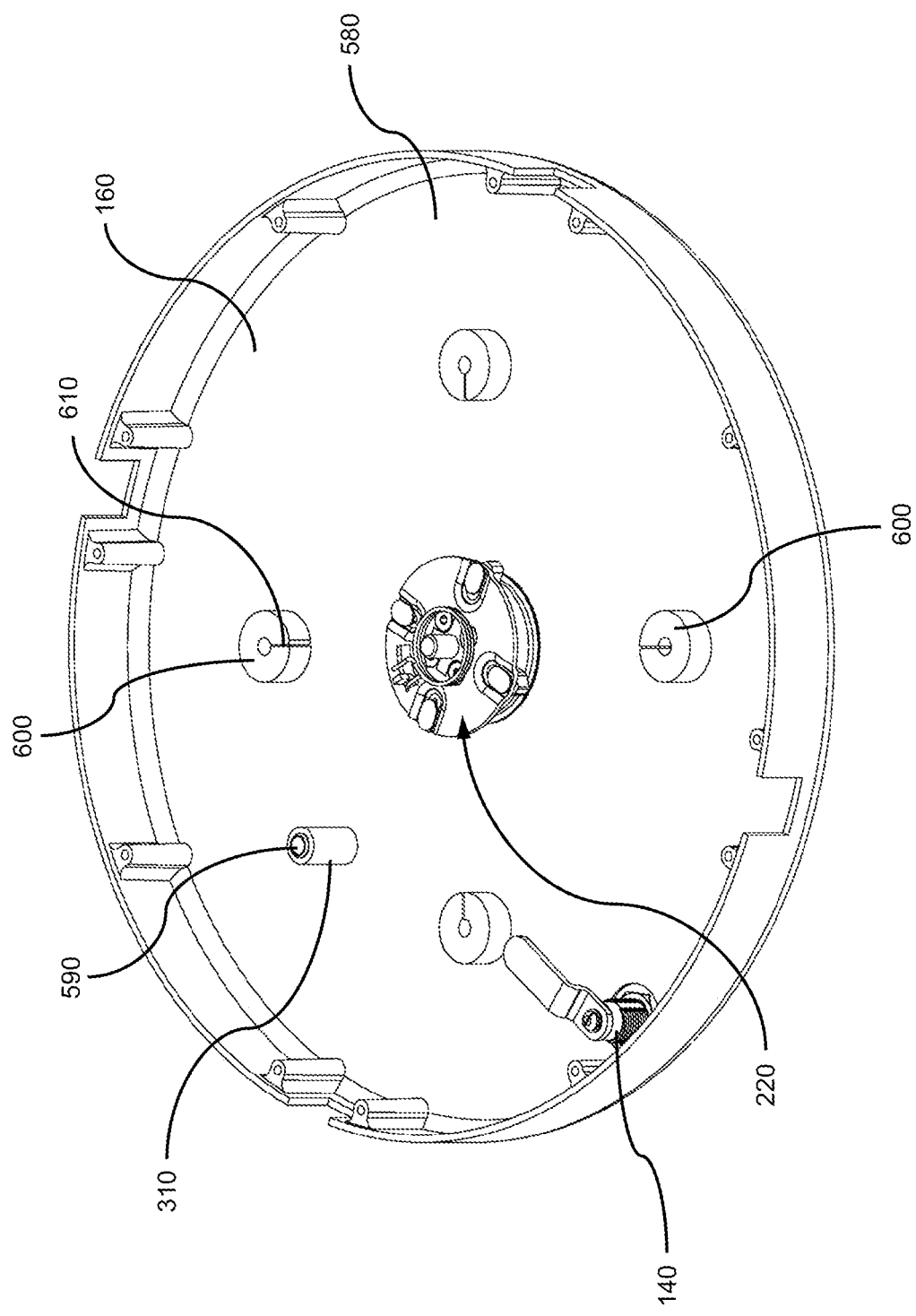
FIG. 20 is a bottom perspective view of an upper portion of the case of FIG. 2.

FIG. 20 illustrates a bottom perspective view of an inner face 580 of the case top 160. In this embodiment, a detent plunger 310 is attached to the case top 160. The detent plunger 310 is a cylinder with a first end attached to the case top 160 and a second end composed of a ball tip 590. The ball tip 590 of the detent plunger 310 engages the selector detent holes 300 on the selector assembly 230 (see FIG. 5) to prevent the device from leaving a selected mode without input from the mode selection knob 120.

As also illustrated in FIG. 20, spring hubs 600 are attached to the case top 160. In this embodiment, the spring hubs 600 are cylinders extending from the inner face of the case top 160. The spring hubs 600 feature an aperture running through the entire body of the cylinder and a slot 610 that extends from the aperture of the spring hub 600 to its outer edge. The slot 610 of the spring hub 600 securely captures a tab at the center of the bias spring 200 (as illustrated in FIG. 4). Preferably, there is one spring hub 600 for each spool 190. The spring hub 600 holds fixed a first end of the bias spring 200 as a second end of the bias spring 200 applies torque to the spools 190 in the direction of cable 105 retraction.

Figure 21:
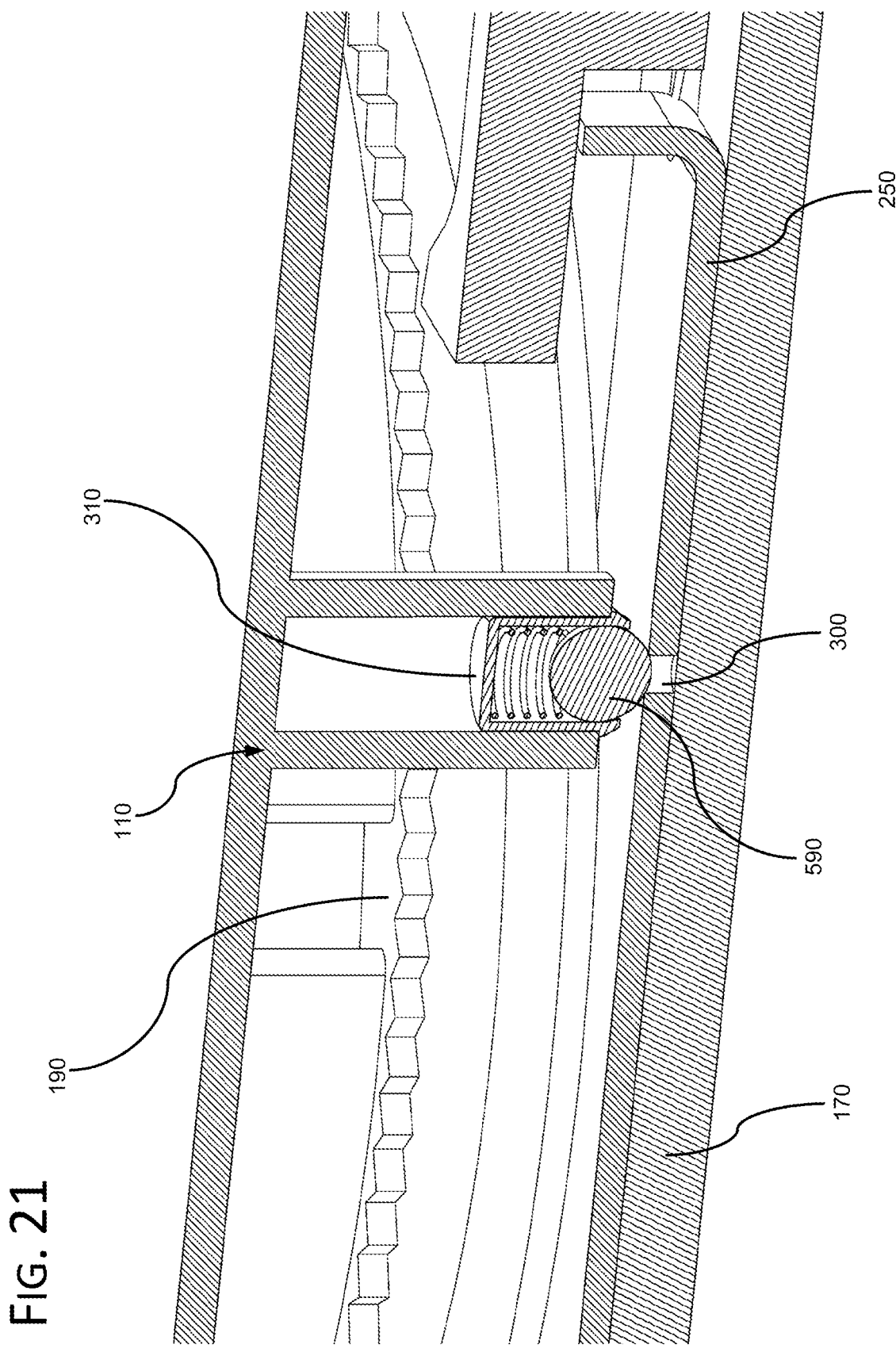
FIG. 21 is a partial cross-sectional view of the selector arm and a detent plunger of FIG. 4.

FIG. 21 illustrates a cross section through the detent plunger 310 and the selector arm 250. As illustrated, the ball tip 590 of the detent plunger 310 is forced under spring pressure into one of the selector detent holes 300 to hold the selector arm 250 in position until the torque applied to the mode selection knob 120 exceeds a predetermined amount. The selector arm 250 may feature a plurality of detent holes 230 to correspond with different modes of operation of the cargo restraint 100.

Figure 22:
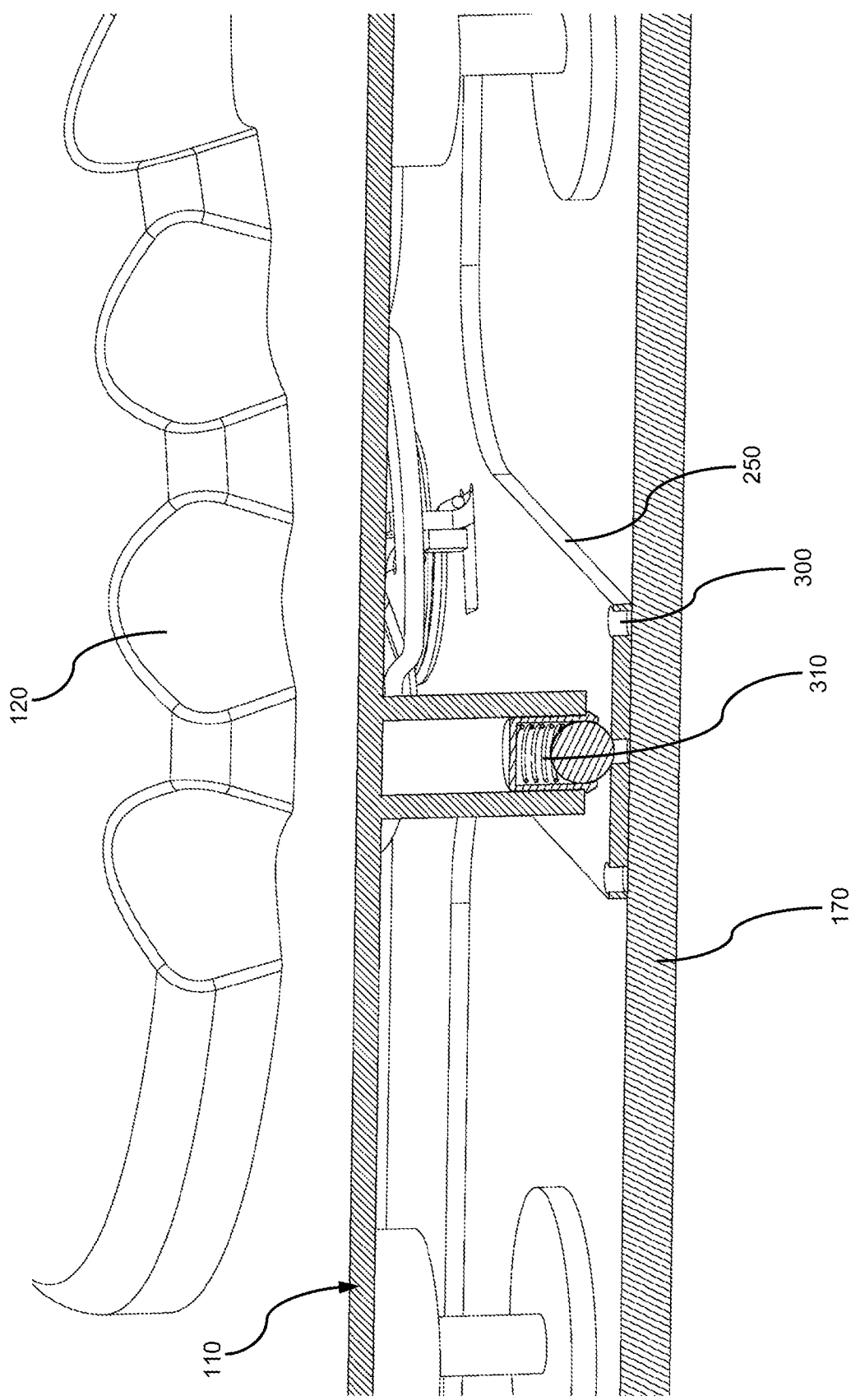
FIG. 22 is a partial cross-sectional view of the selector arm and the detent plunger of FIG. 21, perpendicular to the cross section of FIG. 21.

FIG. 22 illustrates a cross section through the detent plunger 310 and selector arm 250 perpendicular to the cross section in FIG. 21. In this embodiment, the selector arm 250 features three selector detent holes 300.

Figure 23:
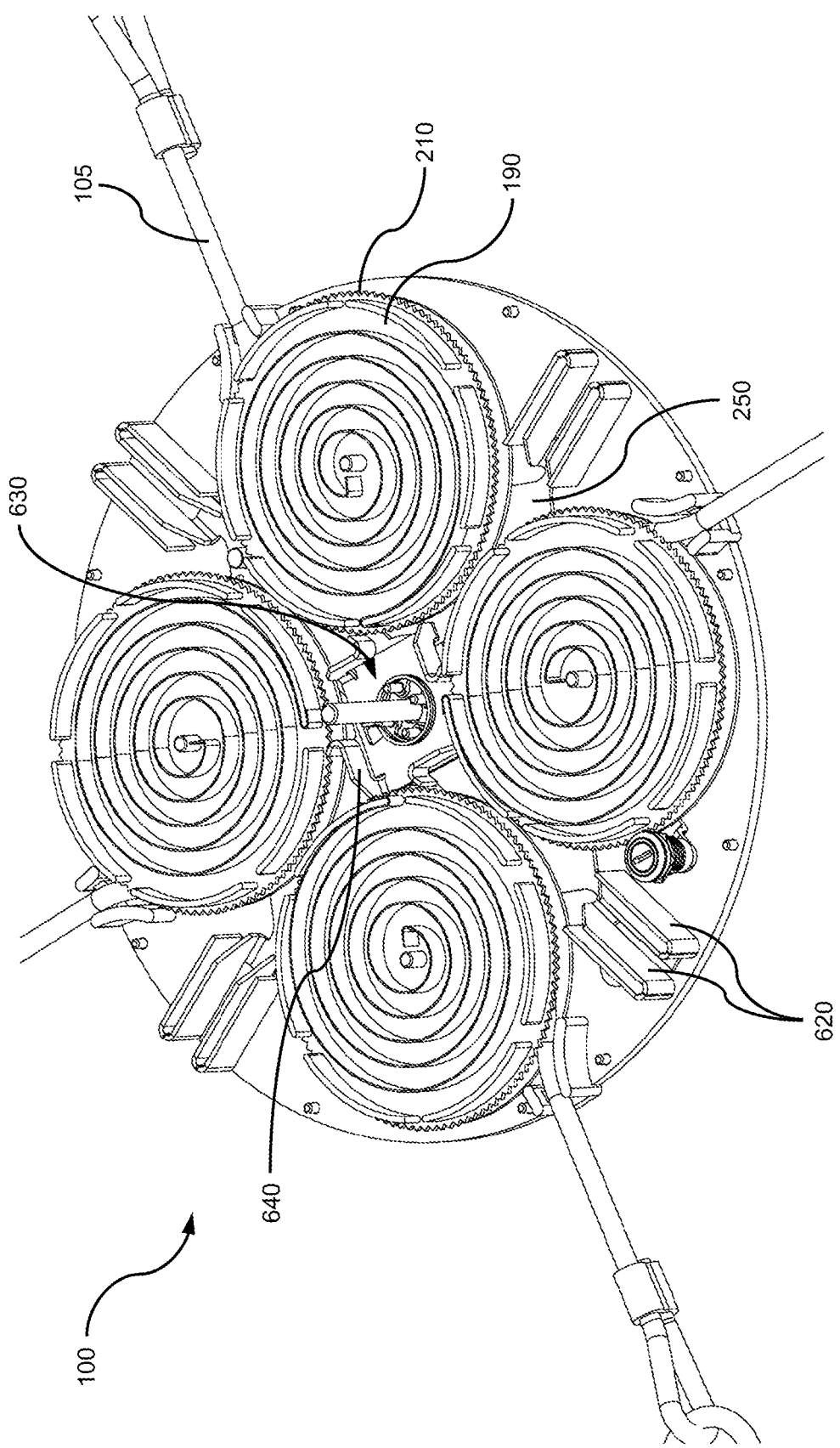
FIG. 23 is a perspective view of an alternative embodiment of interior mechanisms of the cargo restraint of FIG. 1.

FIG. 23 illustrates an alternate embodiment of the cargo restraint 100. In this embodiment, the pivoting selector pawls 260 are replaced by flexible mode selector fingers 620. The flexible selector fingers 620 are positioned at the end of the selector arms 250 that are along the perimeter of the case 110. Also, each selector arm 250 features two sets of flexible selector fingers 620, only one set of which can engage with the ratchet teeth 210 of the spools 190 at any time. When the selector arm 250 is rotated to the "Retract" position, a first set of the flexible mode selection fingers 620 engage the ratchet teeth 210 of the spools 190. In the "Retract" mode, if the spool 190 rotates in the direction of retraction, the selector fingers 620 easily flex and skip over the ratchet teeth 210; in comparison, if the cable 105 is pulled such that the spool 190 tries to rotate in the direction of extension, the selector fingers 620 catch on the ratchet teeth 210 and prevent the spools 190 from rotating. When the selector arm 250 is rotated to the "Extend" position, a second set of selector fingers 620 engages the spools 190. In this mode, if the spool 190 rotates in the direction of extension, the selection fingers 620 easily flex and skip over the ratchet teeth 210, while if the spool 190 rotates in the direction of retraction, the selection fingers 620 catch on the ratchet teeth 210 and prevent the spools 190 from rotating.

As also illustrated in FIG. 23, the tensioning mechanism 200, the sliding tension pawls 330, and springs 420 are replaced with a tensioning mechanism 630. The tensioning mechanism 630 features flexible tensioner fingers 640 with angled flanges. When the mode selection knob 120 is rotated in the "Tighten" direction, the angled flanges engage the ratchet teeth 210 of the spools 190 and rotate the spools 190 in the direction of retraction. If the tension in one or more cables 105 reaches a predetermined level, the angled flange will slide off of a ratchet tooth by the flexing action the tensioner finger 640. In this way, the tension in the cable 105 will not exceed the pre-determined level. As the mode selection knob 120 and tensioning mechanism 630 rotate back to the "Retract" position, the second face of the angled flange will slide along the opposite face of the ratchet teeth 210 to flex the tensioner finger 640 so that the tensioning mechanism may return to the "retract" position while leaving the spools 190 stationary.

As is evident from the foregoing description, certain aspects of the present invention are not limited by the particular details of the examples illustrated herein, and it is therefore contemplated that other modifications, applications, variations, or equivalents thereof, will occur to those skilled in the art. Many such changes, modifications, variations and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations and other uses in applications which do not depart from the spirit and scope of the present inventions are deemed to be covered by the inventions which are limited only by the claims which follow.

What is claimed is:

1. A locking cargo restraint device for use of anchoring at least one item to a surface, the locking cargo restraint comprising:

a case body that defines an interior region, the case body including two or more apertures extending from the interior region to an exterior region of the case body;

two or more cable members, each of the two or more cable members including a first end and a second end;

wherein the first end of each of the two or more cable members is contained within the interior region of the case body;

wherein the second end of a first cable member of the two or more cable members extends outside the case body through a first aperture of the two or more apertures, and the second end of a second cable member of the two or more cable members extends outside the case body through a second aperture of the two or more apertures;

a respective connector affixed to the second end of each of the two or more cable members for attaching each of the two or more cable members to a surface;

two or more spool members secured within the interior region of the case body;

wherein a first spool of the two or more spool members is mechanically connected with the first cable member, and wherein a second spool of the two or more spool members is mechanically connected with the second cable member;

wherein as one spool member of the two or more spool members rotates in a first direction, its respective cable member winds around the spool member;

wherein as one spool member of the two or more spool members rotates in a second direction, its respective cable member unwinds from the spool member;

a tensioner assembly secured within the interior of the case body that engages the two or more spool members to rotate the two or more spool members in the first direction; and a selector assembly secured within the interior of the case body for preventing rotation of the two or more spool members in the first direction when a mode selection knob is placed in a first position and for preventing the rotation of the two or more spool members in the second direction when the mode selection knob is placed in a second position.

2. The locking cargo restraint device of claim 1, wherein: the case body further includes of a top portion and a bottom portion; and wherein the top portion and the bottom portion of the case body are separable from each other.

3. The locking cargo restraint device of claim 1, wherein the locking cargo restraint device further includes a lock mechanism on an exterior surface of the case body to limit the motion of the selector assembly.

4. The locking cargo restraint device of claim 1, wherein the tensioner assembly slips at a predetermined cable tension to prevent over-tensioning of the two or more cable members.

5. The locking cargo restraint device of claim 1, wherein each of the two or more spool members further includes a bias spring that applies tension to each of the two or more cable members.

6. The locking cargo restraint device of claim 1, wherein an exterior surface of each of the two or more spool members further includes a plurality of teeth.

7. The locking cargo restraint device of claim 6, wherein the tensioner assembly further includes a tensioner body and tensioner pawls, the tensioner pawls being engageable with the plurality of teeth on the exterior surface of the two or more spool members to increase the tension in the two or more cable members by causing rotation of the two or more spool members in the first direction.

8. The locking cargo restraint device of claim 6, wherein:
the selector assembly further includes two or more selector arms including pawls mounted thereon, the pawls being engageable with the plurality of teeth on the exterior of the two or more spool members; and
wherein the selector assembly is placeable in a first, second, or third position.

9. The locking cargo restraint device of claim 8, the locking cargo restraint device further comprising:
a detent secured to the case body; and
wherein the detent is engageable with a first selector arm of the two or more of selector arms to hold the two or more of selector arms in a preset position until the position of the two or more selector arms is changed by the mode selection knob.

10. The locking cargo restraint device of claim 9, wherein:
the first selector arm further includes a plurality of apertures that extend through the body of the first selector arm; and
the detent further includes a detent plunger with a ball tip that selectively engages with the plurality of apertures within the first selector arm, corresponding to the first position, the second position, and the third position of the mode selection knob.

11. The locking cargo restraint device of claim 10, wherein the first position of the mode selection knob corresponds with the first position of the selector assembly, the second position of the mode selection knob corresponds with the second position of the selector assembly, and the third position of the mode selection knob corresponds with the third position of the selector assembly.

12. The locking cargo restraint device of claim 6, wherein the tensioner assembly is further comprised of flexible tensioner fingers with angled flanges, the flexible tensioner fingers being engageable with the plurality of teeth on the exterior surface of the two or more spool members to increase the tension in the two or more cable members by causing rotation of the two or more spool members in the first direction.

13. The locking cargo restraint device of claim 6, wherein:
the selector assembly further includes two or more flexible selector fingers, the two or more flexible selector fingers being engageable with the plurality of teeth on the exterior of the two or more spool members; and
wherein the selector assembly is placeable in a first, second, or third position.

14. The locking cargo restraint device of claim 13, wherein the locking cargo restraint device further includes a lock mechanism on an exterior surface of the case body to limit the operation of the selector assembly.

15. A locking cargo restraint device for use of anchoring at least one item to a surface, comprising:
a case body that defines an interior region, the case body including two or more apertures extending from the interior region to an exterior region of the case body;
a first cable member and a second cable member, each of the first cable member and the second cable member including a first end and a second end;
at least a first spool and a second spool, each spool having a cavity in an interior portion of the spool, and each spool secured to the interior region of the case body
wherein when the first spool rotates in a first direction, the first cable member winds within the first spool,
wherein when the first spool rotates in a second direction, the first cable member unwinds within the first spool,
wherein when the second spool rotates in the first direction, the second cable member winds within the second spool, and
wherein when the second spool rotates in the second direction, the second cable member unwinds within the second spool;
wherein the first end of the first cable member extends through a first aperture of the two or more apertures, and the first end of the second cable member extends through a second aperture of the two or more apertures;
wherein the second end of the first cable member is in mechanical connection with the first spool and the second end of the second cable member is in mechanical connection with the second spool; and
a tensioner assembly secured within the interior of the case body that engages with the first spool and the second spool to selectively cause each of the spools to rotate; and
a selector assembly that selectively prevents rotation of the first spool and the second spool in the first direction while allowing rotation in the second direction, or prevents rotation of the first spool and the second spool in the second direction while allowing rotation in the first direction.

16. The locking cargo restraint device of claim 15, wherein the tensioner assembly engages with the first spool and the second spool to selectively cause each spool to rotate in the first direction.

17. The locking cargo restraint device of claim 15, the locking cargo restraint device further comprising:
a mode selection knob affixed to the exterior surface of the case body;
a detent attached to the interior surface of the case body; and
wherein the detent operably engages with the selector assembly to hold the selector assembly in a preset position until the position of the selector assembly is changed by the mode selection knob.

18. The locking cargo restraint device of claim 15, wherein the locking cargo restraint device further includes a lock mechanism on an exterior surface of the case body to limit the operation of the selector assembly.

\* \* \* \* \*